(12) United States Patent
Furuse

(10) Patent No.: US 7,818,133 B2
(45) Date of Patent: Oct. 19, 2010

(54) LEAK INSPECTION METHOD AND LEAK INSPECTOR

(75) Inventor: Akio Furuse, Tokyo (JP)

(73) Assignee: Cosmo Instruments Co., Ltd., Tokyo (JP)

( * ) Notice: Subject to any disclaimer, the term of this patent is extended or adjusted under 35 U.S.C. 154(b) by 224 days.

(21) Appl. No.: 12/227,563

(22) PCT Filed: May 24, 2007

(86) PCT No.: PCT/JP2007/060574

§ 371 (c)(1),
(2), (4) Date: Nov. 21, 2008

(87) PCT Pub. No.: WO2007/136109

PCT Pub. Date: Nov. 29, 2007

(65) Prior Publication Data

US 2009/0132185 A1     May 21, 2009

(30) Foreign Application Priority Data

May 24, 2006    (JP)    .............................. 2006-143792

(51) Int. Cl.
*G01M 3/04*    (2006.01)

(52) U.S. Cl. ....................................................... 702/51

(58) Field of Classification Search ..................... 702/51
See application file for complete search history.

(56) References Cited

FOREIGN PATENT DOCUMENTS

| JP | 11-118657 | 4/1999 |
|---|---|---|
| JP | 2001-050854 | 2/2001 |
| JP | 2005-017107 | 1/2005 |
| JP | 2005-106539 | 4/2005 |

*Primary Examiner*—Tung S Lau
(74) *Attorney, Agent, or Firm*—David N. Lathrop

(57) ABSTRACT

In a calibration mode, an equilibrium period after pressurized gas is sealed in a device under inspection and a reference tank is divided into two periods; pressure-difference changes $\Delta P1$ and $\Delta P2$ are measured when a first-half equilibrium period of duration T1 elapses and when a second-half equilibrium period of duration T1 elapses, respectively; and a pressure-difference change $\Delta P3$ generated in an inspection period of duration T2 is measured. A pressure-difference change CT2 generated for duration T2 from when a period of time in which the influence of an adiabatic change seems to become sufficiently stable elapses is measured. A drift correction coefficient K is calculated from these measured values using $K=(\Delta P3-CT2)/(\Delta P1-\Delta P2)$, is stored in a storage section, and is used in an inspection mode.

18 Claims, 13 Drawing Sheets

| A | B | C | D | E | F | G | H | I |
|---|---|---|---|---|---|---|---|---|
| TEMP OF DUI (°C) | ΔP1' IN 1st EQUILIBRIUM PERIOD (daPa) | ΔP2' IN 2nd EQUILIBRIUM PERIOD (daPa) | ΔP3' IN INSPECTION PERIOD (daPa) | ΔP1'−ΔP2' | DRIFT CORRECTION COEFFICIENT K | DRIFT CORRECTION J=(ΔP1'−ΔP2')K | | |
| 11.5 | 70 | 15.7 | 5.1 | 54.3 | | 4.7 | 0.4 | 1.0 |
| | 71 | 16.0 | 5.2 | 55.0 | | 4.8 | 0.4 | 1.1 |
| | 71 | 16.0 | 5.2 | 55.0 | | 4.8 | 0.4 | 1.1 |
| | 74 | 16.2 | 5.3 | 57.8 | | 5.0 | 0.3 | 1.2 |
| | 70 | 15.8 | 5.2 | 54.2 | | 4.8 | 0.4 | 1.1 |
| | | | | | | | AVE 0.4 | AVE 1.1 |
| 34.2 | 51 | 11.0 | 3.6 | 40.0 | | 3.5 | 0.1 | −0.5 |
| | 53 | 11.2 | 3.7 | 41.8 | | 3.6 | 0.1 | −0.4 |
| | 53 | 11.3 | 3.5 | 41.7 | | 3.6 | −0.1 | −0.6 |
| | 52 | 11.3 | 3.7 | 40.7 | | 3.5 | 0.2 | −0.4 |
| | 52 | 11.2 | 3.6 | 40.8 | | 3.5 | 0.1 | −0.5 |
| | | | | | | | AVE 0.1 | AVE −0.5 |
| 24.0 | 61 | 13.1 | 4.0 | 47.9 | | 4.2 | −0.2 | −0.1 |
| | 61 | 13.2 | 4.0 | 47.8 | | 4.2 | −0.2 | −0.1 |
| | 59 | 12.8 | 4.1 | 46.2 | | 4.1 | 0 | 0 |
| | 60 | 13.0 | 4.1 | 47.0 | | 4.1 | 0 | 0 |
| | 59 | 12.7 | 4.1 | 46.3 | | 4.0 | 0.1 | 0 |
| | | | AVE J'=4.1 | AVE 47.0 | 0.087 | | AVE −0.1 | AVE 0 |

H: CORRECTION RESULT OBTAINED WITH DRIFT CORRECTION COEFFICIENT
I: CORRECTION RESULT OBTAINED WITH FIXED CORRECTION

FIG. 13

LEAK INSPECTION METHOD AND LEAK INSPECTOR

TECHNICAL FIELD

The present invention relates to a leak inspection method used in leak inspection that checks whether or not a various types of containers and other devices have a leak, and to a leak inspector operated by using the leak inspection method.

BACKGROUND ART

Products or components that should not have a leak when used have been conventionally checked in their production lines for their acceptability.

FIG. 8 is a block diagram showing a general structure of a leak inspector used for such a check. A flow pipe 10 connected to the outlet side of a pneumatic source 11 is extended through a pressure control valve 12 and a three-way solenoid valve 14 and branches into branch pipes 15A and 15B at the outlet side of the three-way solenoid valve 14. Between the outlet side of the pressure control valve 12 and the inlet side of the three-way solenoid valve 14, a pressure gauge 13 for monitoring a specified inspection pressure is connected.

The branch pipe 15A is connected to one end of a guide pipe 18 through a solenoid valve 16, and the other end of the guide pipe 18 is connected a connection jig 24 that can be connected to a device 20 under inspection to be checked for a leak. Devices 20 under inspection are sequentially connected to the connection jig 24 to allow leak inspection therefor.

The branch pipe 15B is connected to one end of a guide pipe 19 through a solenoid valve 17, and the other end of the guide pipe 19 is connected to a reference tank 21. The guide pipes 18 and 19 are respectively connected to guide pipes 18A and 19A, as branches, and a pressure-difference detector 22 is connected between the guide pipes 18A and 19A.

The output signal of the pressure-difference detector 22 is sent to a comparator 32 through an automatic-zero-reset amplifier 31, and can be compared in the comparator 32 with a reference value RV given by a reference-value setter 33.

The device 20 is connected to the end of the guide pipe 18; the reference tank 21, having no leak, is connected to the guide pipe 19; the three-way solenoid valve 14 is closed between a and b; and the pressure control valve 12 is adjusted while the pressure gauge 13 is monitored, to provide a predetermined air pressure from the pneumatic source 11. Then, the solenoid valves 16 and 17 are opened; the three-way solenoid valve 14 is opened between a and b; and the specified constant air pressure is applied to the device 20 and the reference tank 21 through the branch pipes 15A and 15B and the guide pipes 18 and 19, respectively.

When the pressure in the device 20 and the reference tank 21 becomes stable after a predetermined period of time elapses, the solenoid valves 16 and 17 are closed. Then, after a predetermined stabilizing period of time (equilibrium time) further elapses, the output signal SD of the automatic-zero-reset amplifier 31, connected to the pressure-difference detector 22, is read.

When the device 20 is completely air tight and has no leak, the output signal SD of the amplifier 31 is ideally zero once a predetermined detection period of time has elapsed. If the device 20 has a leak, the output signal SD gradually decreases when the inside pressure is positive, and the output signal SD gradually increases when the inside pressure is negative. The output signal SD is almost proportional to the negative or positive amount of leakage in the predetermined detection period of time.

The reference value RV given by the reference-value setter 33 and the output value of the amplifier 31 are compared by the comparator 32. An acceptable/defective decision output 35 showing whether the device is acceptable or defective is obtained depending on whether the output value exceeds the reference value RV.

Even when the reference tank 21 has the same shape as the device 20 and has no leak, the pressure difference detected by the pressure-difference detector 22 is mainly influenced by the temperature difference between the device 20 and the reference tank 21 in this general leak inspector. If the device 20 and the reference tank 21 have different shapes, the pressure difference varies due to the difference in temperature between the gases in the device 20 and the reference tank 21 during a process in which the temperatures of the gases increased by the adiabatic changes caused when the gases are pressurized. Therefore, the output signal does not become zero, the ideal state. Alternatively, if the device 20 and the reference tank 21 have different temperatures, the pressure difference varies during a thermal equilibrium process after the adiabatic changes. In other words, even if the device 20 has no leak, the output signal does not become zero, the ideal state, during the predetermined detection period of time, and a pressure difference corresponding to the positive or negative amount of leakage is usually detected. This pressure difference caused by factors other than a leak is generally called a drift.

The above-described state will be explained with reference to FIG. 9. In FIG. 9, a curve A shows the drift, a curve B shows the leak, and a curve C shows the pressure difference, that is, the drift plus the leak, substantially detected by the pressure-difference detector 22. As understood from the figure, the pressure difference, indicated by the curve C, includes the drift as its major part and the leak as its minor part. As understood from the figure, the increase in the pressure difference caused by the drift approaches almost zero as time elapses. In contrast, the pressure difference caused by the leak increases almost at a constant rate as time elapses.

Focusing on this point, in the leak inspector having the structure shown in FIG. 8, the output of the automatic-zero-reset amplifier 31 is forcedly reset to zero at a certain time, TIM1 (time after the rate of increase in the drift approaches zero, shown in FIG. 9); the gain of the amplifier 31 is increased after the reset to amplify the detection signal of the pressure-difference detector 22, and the output signal SD (curve D) is sent to the comparator 32; the output signal SD obtained after a predetermined period of time is compared with the reference value RV in the comparator 32; and it is determined that the device is defective if the output signal SD exceeds the reference value RV.

With this detection method, since inspection is started after the rate of increase in the drift approaches zero, the influence of the drift can be removed. However, the inspection time for one device under inspection is as long as several tens of seconds.

To eliminate this drawback, a leak inspection method shown in FIG. 10 has been proposed. In this method, in a calibration mode, the pressure difference detected by the pressure-difference detector 22 after the pressure applying and equilibrium periods is reset to zero at regular intervals of unit detection periods, for example, by the automatic-zero-reset amplifier 31, described with reference to FIG. 8; this reset operation is repeated until a change in the pressure difference converges to within a constant range in the unit detection period; and the change Db in the pressure difference is obtained when it converges. The change Db in the pressure difference is a pressure difference change caused by an actual leak in the unit detection period.

Therefore, the drift caused in the thermal equilibrium process during the inspection period after the adiabatic change can be obtained by subtracting Db from a change Da in the pressure difference in the first unit detection period, that is, Da−Db=Dc. This value Dc is stored as a drift correction value. In an inspection mode, a pressurized gas is applied to the device 20, and the drift correction value Dc is subtracted from a change Da in the pressure difference in the first unit detection period immediately after the pressurization and equilibrium periods to obtain a change Db in the pressure difference in the unit detection period, corresponding to the actual leak of the device 20.

With the calibration method shown in FIG. 10, correct leak inspection is executed only for the temperature environment (air temperature and the temperature of the device 20) where the calibration is executed. However, in the leak inspection mode, if the room temperature or the temperature of the device 20 differs by a predetermined value or more from the temperature in the calibration mode where the drift correction value Dc is obtained, it is necessary to execute the calibration again to obtain an appropriate drift correction value Dc.

In the above description, the pressure-difference leak inspector shown in FIG. 8 has been taken as an example. A drift also occurs in another type of leak inspector (hereinafter called a gauge-pressure type leak inspector), shown in FIG. 11, in which a pressurized gas is directly applied to a device 20 under inspection; the gas pressure is measured by a pressure measuring unit 23; whether a leak exists is determined based on whether the pressure of the gas sealed in the device 20 changes by a predetermined value or more. Therefore, the gauge-pressure type leak inspector also has the same drawback as the pressure-difference leak inspector.

To eliminate the drawbacks of the pressure-difference leak inspector and the gauge-pressure type leak inspector, the applicant proposed, in Patent Literature 1, a drift-correction-coefficient calculation method, a drift correction method for correcting a drift by using a drift correction coefficient calculated by the drift-correction-coefficient calculation method, a drift-correction-coefficient learning method, and a leak inspection method and a leak inspector that use each of the methods.

In the leak inspector proposed before, in a calibration mode, a positive or negative gas pressure is applied to a device under inspection and a reference tank; changes $\Delta P1$ and $\Delta P2$ in pressure difference are measured when duration T1 elapses from the end of the pressure applying and equilibrium periods (see FIG. 10) and when duration T1 further elapses, respectively; a change $\Delta C$ in pressure difference, corresponding to the leak of the device, obtained when duration T1 elapses from when the temperatures of the device and the reference tank become stable is measured; and a drift correction coefficient K is calculated from the changes $\Delta P1$, $\Delta P2$, and $\Delta C$ using the expression $K=(\Delta P2-\Delta C)/(\Delta P1-\Delta P2)$. In an inspection mode, changes $\Delta P1'$ and $\Delta P2'$ in pressure difference are measured when duration T1 elapses from the end of the pressure applying and equilibrium periods and when duration T1 further elapses, respectively; the drift correction coefficient K is used to estimate a drift J from the expression $J=(\Delta P1'-\Delta P2')K$; and a change S in pressure difference in which the drift has been corrected, corresponding to the leak, is calculated from the expression $S=\Delta P2'-J$.

An operation sequence in the inspection mode in the general leak inspector will be described with reference to FIG. 12. In FIG. 12, a period A1 indicates a pressure applying period, a period A2 indicates an equilibrium period, a period A3 indicates an inspection period, and a period A4 indicates a discharge period. In the pressure applying period A1, the three-way solenoid valve 14, shown in FIG. 8, is opened between a and b, and the valves 16 and 17 are also opened to apply a constant-pressure gas to the device 20 and the reference tank 21. In the equilibrium period A2, the valves 16 and 17 are closed to seal the device 20 and the reference tank 21 having the gas applied thereto, and stable gas pressure is awaited. In other words, this period is a thermal equilibrium process where the temperature of the inside gas increased by the adiabatic change in the pressure applying period A1 is gradually reduced to the temperature of the device. In the inspection period A3, it is determined whether the gas pressure that became stable in the equilibrium period A2 shows a difference. In the discharge period A4, the valves 16 and 17 are opened, and the three-way solenoid valve 14 is opened between b and c to discharge the gases sealed in the device 20 and the reference tank 21 to the atmosphere.

A curve P shown in FIG. 12 indicates a change in pressure in the device or the reference tank. The pressure abruptly increases in the pressure applying period A1, and the inside gas temperature also rises due to the adiabatic change. In the equilibrium period A2 and the inspection period A3, the inside gas temperature lowers to the temperature of the device, and the applied air pressure gradually becomes stable.

[Patent Literature 1] Japanese Patent Application Laid Open No. 2001-50854

DISCLOSURE OF THE INVENTION

Problems to be Solved by the Invention

As described above, in the drift-correction-coefficient calculation method proposed in Patent Literature 1, the changes $\Delta P1$ and $\Delta P2$ in pressure difference are measured when duration T1 elapses from the start of the inspection period A3 and when duration T1 further elapses, respectively, as shown in FIG. 12. Since the inspection period A3 is arranged after the equilibrium period A2, as described above, the pressure of the gases sealed in the device 20 and the reference tank 21 are stable to some extent. In other words, when the equilibrium period A2 is set to be long, a change in pressure difference during thermal equilibrium transition after the adiabatic change generated in the pressure applying period A1 between the insides of the device 20 and the reference tank 21 may be negligibly small at the start of the inspection period A3, as is clear from the curve P shown in FIG. 12. In that case, when the changes $\Delta P1$ and $\Delta P2$ in pressure difference are measured in the inspection period A3, the changes $\Delta P1$ and $\Delta P2$ are nearly equal. Since the denominator of the calculation expression of the drift correction coefficient, $K=(\Delta P2-\Delta C)/(\Delta P1-\Delta P2)$, is close to zero, it is inconvenient if a reliable drift correction coefficient K is not obtained.

An object of the present invention is to eliminate this inconvenience and to provide a reliable leak inspection method and a reliable leak inspector.

Means to Solve the Problems

A first aspect of the present invention provides a leak inspection method for applying gas to a device under inspection and a reference tank and for determining whether or not the device has a leak based on whether the device and the reference tank have a pressure difference equal to or larger than a predetermined value when a predetermined period of time elapses, the leak inspection method including:

in a calibration mode, (a-1) a step of applying a predetermined gas pressure to the device and the reference tank only for a pressure applying period of a predetermined length and then stopping application thereof;

(a-2) a step of measuring a first pressure-difference change $\Delta P1$ between pressure differences generated between the device and the reference tank in a first equilibrium period after the end of the pressure applying period;

(a-3) a step of measuring a second pressure-difference change $\Delta P2$ between pressure differences generated between the device and the reference tank in a second equilibrium period after the end of the first equilibrium period;

(a-4) a step of measuring a third pressure-difference change $\Delta P3$ between pressure differences generated between the device and the reference tank in a first inspection period after the end of the second equilibrium period;

(a-5) a step of measuring a fourth pressure-difference change $\Delta P4$ between pressure differences generated between the device and the reference tank in a second inspection period after the end of the first inspection period; and (a-6) a step of calculating and storing a drift correction coefficient K corresponding to a drift included in the third pressure-difference change $\Delta P3$, from the difference ($\Delta P3-\Delta P4$) between the third and fourth pressure-difference changes and the difference ($\Delta P1-\Delta P2$) between the first and second pressure-difference changes, and of discharging the gas from the device and the reference tank; and in an inspection mode, (b-1) a step of applying the predetermined gas pressure to the device and the reference tank only for the pressure applying period and then stopping application thereof;

(b-2) a step of measuring a first pressure-difference change $\Delta P1'$ between pressure differences generated between the device and the reference tank in the first equilibrium period;

(b-3) a step of measuring a second pressure-difference change $\Delta P2'$ between pressure differences generated between the device and the reference tank in the second equilibrium period;

(b-4) a step of measuring a third pressure-difference change $\Delta P3'$ between pressure differences generated between the device and the reference tank in the first inspection period;

(b-5) a step of estimating a drift included in the third pressure-difference change $\Delta P3'$, from the difference ($\Delta P1'-\Delta P2'$) between the first and second pressure-difference changes and the drift correction coefficient K, and (b-6) a step of estimating a leak of the device by subtracting the drift from the third pressure-difference change $\Delta P3'$, and of discharging the gas from the device and the reference tank.

The first aspect of the present invention provides a leak inspector including:

a pneumatic source adapted to apply gas pressure to a device under inspection and a reference tank;

a pressure-difference measurement section adapted to measure a pressure-difference change between pressure differences generated between the device and the reference tank after gas having a predetermined pressure is applied to the device and the reference tank from the pneumatic source only for a pressure applying period of a predetermined length;

a drift-correction-coefficient calculation section adapted to calculate, from first and second pressure-difference changes $\Delta P1$ and $\Delta P2$ generated in a first equilibrium period after the pressure applying period and in a second equilibrium period following the first equilibrium period and measured by the pressure-difference measurement section, and from third and fourth pressure-difference changes $\Delta P3$ and $\Delta P4$ generated in a first inspection period after the second equilibrium period and in a second inspection period after the first inspection period and measured by the pressure-difference measurement section, a drift correction coefficient K corresponding to a drift included in the third pressure-difference change $\Delta P3$, based on the difference ($\Delta P3-\Delta P4$) between the third and fourth pressure-difference changes and the difference ($\Delta P1-\Delta P2$) between the first and second pressure-difference changes, when gas pressure is applied to the device and the reference tank only for the pressure applying period in a calibration mode;

a drift-correction-coefficient storage section adapted to store the drift correction coefficient K;

a drift calculation section adapted to calculate, from first and second pressure-difference changes $\Delta P1'$ and $\Delta P2'$ generated in the first equilibrium period after the pressure applying period and in the second equilibrium period following the first equilibrium period and measured by the pressure-difference measurement section, and from a third pressure-difference change $\Delta P3'$ generated in the first inspection period after the second equilibrium period and measured by the pressure-difference measurement section, a drift included in the third pressure-difference change $\Delta P3'$, based on the difference ($\Delta P1'-\Delta P2'$) between the first and second pressure-difference changes and the drift correction coefficient K, when gas pressure is applied to the device and the reference tank only for the pressure applying period in an inspection mode;

a drift correction section adapted to subtract the drift from the third pressure-difference change $\Delta P3'$ to calculate a pressure-difference change S in which drift correction has been made; and a decision section adapted to compare the pressure-difference change S with a setting, and to determine that the device has a leak when the pressure-difference change S exceeds the setting.

A second aspect of the present invention provides a leak inspection method for applying gas to a device under inspection and for determining whether or not the device has a leak based on whether a pressure change equal to or larger than a predetermined value occurs when a predetermined period of time elapses, the leak inspection method including:

in a calibration mode, (a-1) a step of applying a predetermined gas pressure to the device only for a pressure applying period of a predetermined length and then stopping application thereof;

(a-2) a step of measuring a first pressure change $\Delta Q1$ of the device generated in a first equilibrium period after the end of the pressure applying period;

(a-3) a step of measuring a second pressure change $\Delta Q2$ of the device generated in a second equilibrium period after the end of the first equilibrium period;

(a-4) a step of measuring a third pressure change $\Delta Q3$ of the device generated in a first inspection period after the end of the second equilibrium period;

(a-5) a step of measuring a fourth pressure change $\Delta Q4$ of the device generated in a second inspection period after the end of the first inspection period; and (a-6) a step of calculating and storing a drift correction coefficient K corresponding to a drift included in the third pressure change $\Delta Q3$, from the difference ($\Delta Q3-\Delta Q4$) between the third and fourth pressure changes and the difference ($\Delta Q1-\Delta Q2$) between the first and second pressure changes, and of discharging the gas from the device; and in an inspection mode, (b-1) a step of applying the predetermined gas pressure to the device only for the pressure applying period and then stopping application thereof;

(b-2) a step of measuring a first pressure change $\Delta Q1'$ of the device generated in the first equilibrium period;

(b-3) a step of measuring a second pressure change $\Delta Q2'$ of the device generated in the second equilibrium period;

(b-4) a step of measuring a third pressure change $\Delta Q3'$ of the device generated in the first inspection period;

(b-5) a step of estimating a drift included in the third pressure change $\Delta Q3'$, from the difference ($\Delta Q1'-\Delta Q2'$) between the first and second pressure changes and the drift correction coefficient K, and (b-6) a step of estimating a leak of the device by subtracting the drift from the third pressure change $\Delta Q3'$, and of discharging the gas from the device.

The second aspect of the present invention provides a leak inspector including:

a pneumatic source adapted to apply gas pressure to a device under inspection;

a pressure measurement section adapted to measure a pressure change generated in the device after gas having a predetermined pressure is applied to the device from the pneumatic source only for a pressure applying period of a predetermined length;

a drift-correction-coefficient calculation section adapted to calculate, from first and second pressure changes $\Delta Q1$ and $\Delta Q2$ generated in a first equilibrium period after the pressure applying period and in a second equilibrium period following the first equilibrium period and measured by the pressure measurement section, and from third and fourth pressure changes $\Delta Q3$ and $\Delta Q4$ generated in a first inspection period after the second equilibrium period and in a second inspection period after the first inspection period and measured by the pressure measurement section, a drift correction coefficient K corresponding to a drift included in the third pressure change $\Delta Q3$, based on the difference ($\Delta Q3-\Delta Q4$) between the third and fourth pressure changes and the difference ($\Delta Q1-\Delta Q2$) between the first and second pressure changes, when gas pressure is applied to the device only for the pressure applying period in a calibration mode;

a drift-correction-coefficient storage section adapted to store the drift correction coefficient K;

a drift calculation section adapted to calculate, from first and second pressure changes $\Delta Q1'$ and $\Delta Q2'$ generated in the first equilibrium period after the pressure applying period and in the second equilibrium period following the first equilibrium period and measured by the pressure measurement section, and from a third pressure change $\Delta Q3'$ generated in the first inspection period after the second equilibrium period and measured by the pressure measurement section, a drift included in the third pressure change $\Delta Q3'$, based on the difference ($\Delta Q1'-\Delta Q2'$) between the first and second pressure changes and the drift correction coefficient K, when gas pressure is applied to the device only for the pressure applying period in an inspection mode;

a drift correction section adapted to subtract the drift from the third pressure change $\Delta Q3'$ to calculate a pressure change U in which drift correction has been made; and a decision section adapted to compare the pressure change U with a setting, and to determine that the device has a leak when the pressure change U exceeds the setting.

Effects of the Invention

According to the present invention, the pressure-difference changes $\Delta P1$ and $\Delta P2$ or the pressure changes $\Delta Q1$ and $\Delta Q2$ generated during the first and second equilibrium periods immediately after the pressure applying period are measured, and the drift correction coefficient K is calculated from these measured values. In the equilibrium periods, the pressure-difference changes caused by the adiabatic changes given to the gases are attenuating, and therefore, the pressure-difference changes largely subjected to the influence of the adiabatic changes are large. As a result, the term ($\Delta P1-\Delta P2$) or ($\Delta Q1-\Delta Q2$), used in the drift-correction-coefficient calculation expression, is not close to zero. A precise drift correction coefficient K can thus be obtained, allowing rapid leak inspection.

BRIEF DESCRIPTION OF THE DRAWINGS

FIG. 13 is a diagram showing examples used to confirm the effects of the present invention.

BEST MODES FOR CARRYING OUT THE INVENTION

Method for Calculating a Drift Correction Coefficient and a Drift

A process of calculating a drift correction coefficient K used in a leak inspection method according to the present invention will be described first with reference to FIG. 1. A tank having good temperature stability in which the temperature of a pressurized gas becomes quickly stable in a pressure applying period is used as a reference tank in the present invention. In the present invention, as shown by a characteristic curve P in FIG. 1 indicating a pressure-difference change, an equilibrium period after the pressure applying period is divided into two periods; pressure-difference changes $\Delta P1$ and $\Delta P2$ are measured when duration T1 elapses from the start of the equilibrium period and when duration T1 further elapses, respectively; a pressure-difference change $\Delta P3$ is measured when duration T2 elapses from the start of an inspection period following the equilibrium period; a pressure-difference change ΔP4 generated during the last duration T2 in the inspection period is measured; and the correction coefficient K is calculated from these measured values using the expression K=(ΔP3−ΔP4)/(ΔP1−ΔP2).

Figure 12:
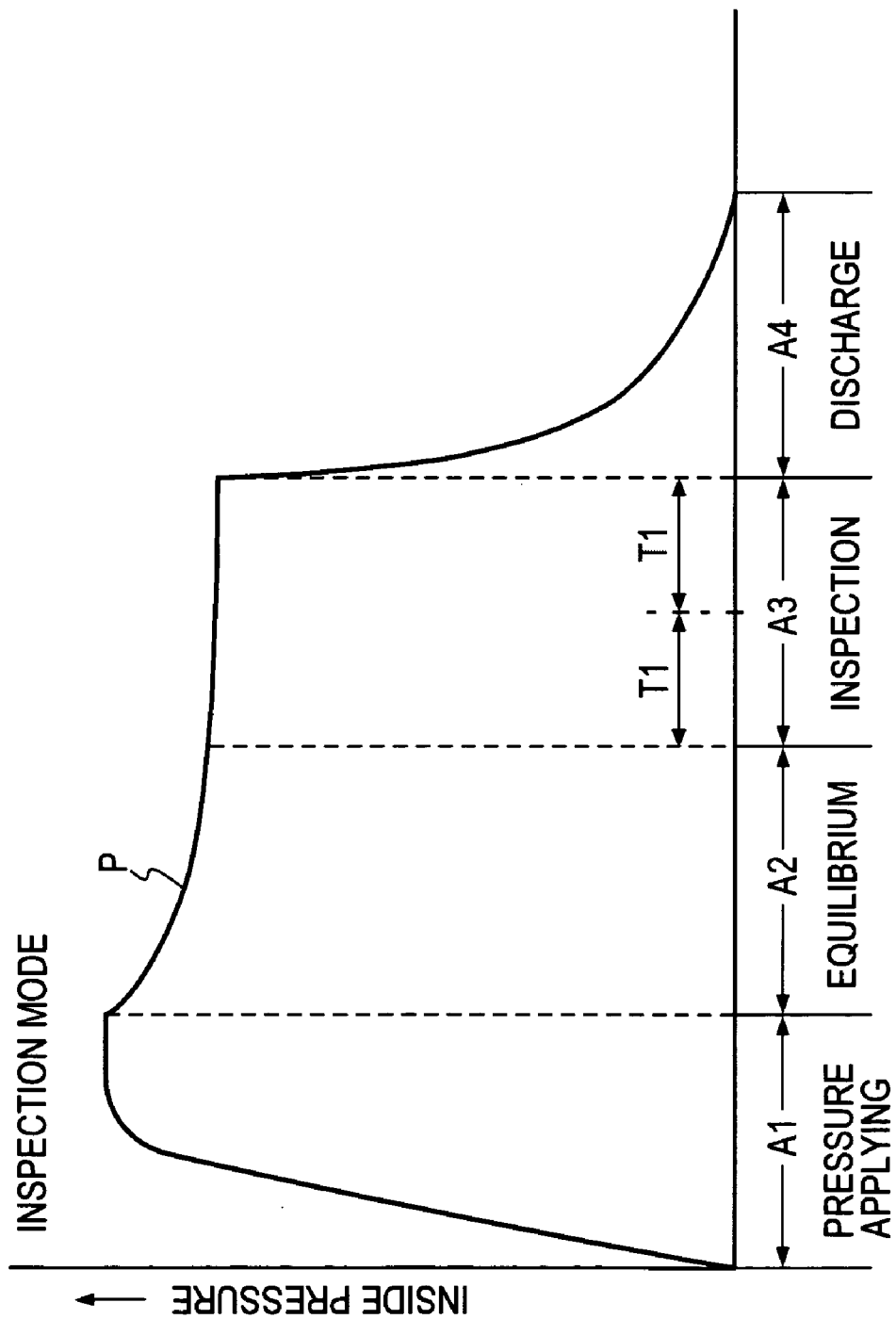
FIG. 12 is a graph showing a general operation cycle of the conventional leak inspector.

The present invention differs from Patent Literature 1, described above, in that the pressure-difference changes ΔP1 and ΔP2 are measured in a period corresponding to the equilibrium period A2 in FIG. 12, not in a period corresponding to the inspection period A3. In an inspection mode of the present invention, pressure-difference changes ΔP1', ΔP2', and ΔP3' are measured at the same timing as in the calibration mode, and the gases are discharged after the end of a first inspection period in FIG. 1.

Figure 1:
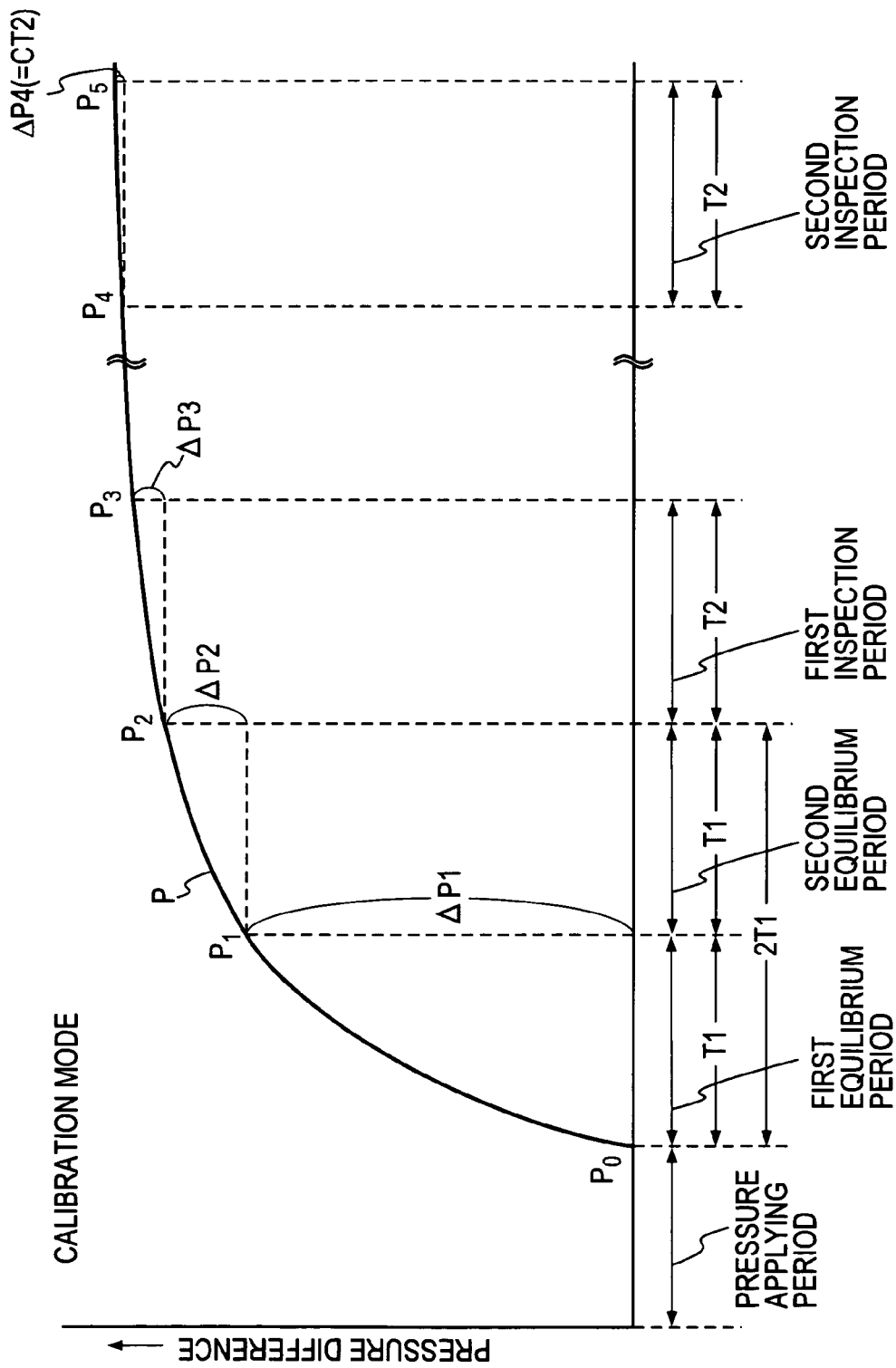
FIG. 1 is a graph showing a drift-correction-coefficient calculation method according to the present invention.

Also when a gauge-pressure type leak inspector is used, pressure changes ΔQ1, ΔQ2, ΔQ3, and ΔQ4 are measured at the same timing as shown in FIG. 1, and a drift correction coefficient is calculated in the same calculation process as for the drift correction coefficient used for the pressure-difference leak inspector. Therefore, only the pressure-difference changes ΔP1, ΔP2, ΔP3, and ΔP4 will be described below.

Pressure Pt during a thermal equilibrium period after an adiabatic change is attenuated, and the change in pressure is expressed by the following differential equation, $$dP_t/dt = Ae^{-kt} + C \qquad (1)$$

where A and k are constants, and C is a time derivative of a leak pressure difference, which is regarded as a constant. How the correction coefficient is expressed in terms of the difference of pressure differences (a pressure-difference change when time T elapses) is examined next.

The pressure-difference change obtained when an equilibrium period of duration T1 passes is expressed as follows:

$$\Delta P_{T1} = (A/k)(1-e^{-kT1}) + CT1 \qquad (2)$$

The pressure-difference change obtained when an equilibrium period of duration 2T1 passes is expressed as follows:

$$\Delta P_{2T1} = (A/k)(1-e^{-2kT1}) + 2CT1 \qquad (3)$$

As shown in FIG. 1, when the equilibrium period is set to have duration 2T1, the above pressure-difference changes are expressed by ΔP1 and ΔP2, and (A/k) in Expressions (2) and (3) is expressed by B, Expressions (2) and (3) are written as follows:

$$\Delta P1 = B(1-e^{-kT1}) + CT1 \qquad (4)$$

$$\Delta P1 + \Delta P2 = B(1-e^{-2kT1}) + 2CT1 \qquad (5)$$

When Expression (4) is multiplied by 2 and Expression (5) is subtracted therefrom, the following expression is obtained.

$$\Delta P1 - \Delta P2 = B(1 - 2e^{-kT1} + e^{-2kT1}) \qquad (6)$$

When the duration (measurement duration in the inspection period) after equilibrium is set to T2 (FIG. 1), the following expression is obtained.

$$\Delta P_{2T1+T2} = \Delta P1 + \Delta P2 + \Delta P3 = B(1-e^{-k(2T1+T2)}) + C(2T1+T2) \qquad (7)$$

When Expression (5) is subtracted from Expression (7), the pressure-difference change ΔP3 is obtained as follows:

$$\Delta P3 = B(e^{-2kT1} - e^{-k(2T1+T2)}) + CT2 \qquad (8)$$

In Expression (8), CT2 indicates the leak pressure-difference change ΔP4. When the measurement period is set sufficiently long, the temperature of the gas becomes stable, the drift caused by the adiabatic change becomes zero, and only the leak component remains. Therefore, ΔP4 (=CT2) is obtained first, CT2 is subtracted from Expression (8), and then, the result is divided by Expression (6) to obtain the following expression.

$$\frac{\Delta P3 - CT2}{\Delta P1 - \Delta P2} = \frac{e^{-2kT1} - e^{-k(2T1+T2)}}{1 - 2e^{-kT1} + e^{-2kT1}} = K \qquad (9)$$

In Expression (9), since k is a constant and T1 and T2 can be set to constants, K is also a constant.

Even if the device under inspection used in calibration has a leak and ΔP3 in Expression (9) includes the leak component CT2, since CT2 is subtracted from ΔP3 in the numerator of Expression (9), the leak component is cancelled out from the numerator of Expression (9) by this subtraction. In other words, the numerator of Expression (9) indicates the detected drift, which does not include the leak component. Expression (9) is modified to obtain the following expression.

$$\Delta P3 - CT2 = K(\Delta P1 - \Delta P2) = J \qquad (10)$$

When the constant K is obtained from Expression (9), the drift J obtained at every inspection can be obtained from the pressure-difference changes ΔP1' and ΔP2', obtained in the equilibrium period. More specifically, the drift J obtained at the end of the first inspection period can be estimated from the pressure-difference changes ΔP1' and ΔP2', obtained at the end of the first a equilibrium period and at the end of the second equilibrium period, respectively, using J=(ΔP1'−ΔP2')K. Therefore, the pressure-difference change S corresponding to the leak where the drift has been corrected at the end of the first inspection period can be estimated by S=ΔP3'−J.

Expression (10) means that the drift obtained during inspection can be estimated from the pressure-difference changes in the equilibrium period, and further means that, since the drift is estimated by measuring the pressure-difference changes in the steep thermal equilibrium transition after the adiabatic change caused by pressurization, the pressure-difference changes are large even when the equilibrium period is set long, and the calculation precision of the drift obtained during inspection is high.

Method for Calculating a Drift Correction Coefficient and a Drift, with the Temperature of the Device Under Inspection being Taken into Account The process of calculating the drift correction coefficient K and the drift used in the leak inspection method according to the present invention has been described above. In the above-described calculation of the drift correction coefficient K, it is assumed that the temperature of the device under inspection is the same as the ambient temperature. This assumption is a general one, and usual leak inspection is performed under this assumption.

In contrast, when a high-temperature cleaning process or a cleaning process for cleaning a device under inspection with usual cleaning water is performed before leak inspection, for example, the device is subjected to inspection at a temperature different from the ambient temperature. Under such a condition, drift correction cannot be performed only with the drift correction coefficient K described above. A method for calculating a drift correction coefficient and a drift used when the temperature of a device under inspection differs from the ambient temperature will be described below.

In Expression (10), CT2 (=ΔP4) indicates the pressure-difference change caused by the leak of the device. When the device has a temperature change due to the difference between the temperature of the device and the ambient temperature, thus causing a temperature drift although the device has no leak, it can be seen that the temperature drift shows a certain constant change as the leak. When the temperature drift is expressed by $\Delta P_T$, Expression (10) can be modified to the following expression.

$$\Delta P3 - \Delta P_T = K(\Delta P1 - \Delta P2) \quad (11)$$

In this expression, $\Delta P_T$ indicates the temperature drift caused by the difference between the temperature of the device and the ambient temperature. Since $\Delta P_T$ is substituted for CT2, the temperature difference is proportional to the pressure-difference change $\Delta P4$, generated for duration T2 after the inspection period of a sufficient length elapses when the device has no leak. The temperature drift $\Delta P_T$ measured in the second inspection period when a sufficiently long period elapses between the first inspection period and the second inspection period is expressed by $\Delta P_T = \alpha(\Theta - \theta)$, where $\theta$ indicates the ambient temperature, $\Theta$ indicates the temperature of the device, and $\alpha$ indicates a proportionality constant. Therefore, the overall drift $J_T$ is given by the following expression.

$$J_T = K(\Delta P1' - \Delta P2') + \alpha(\Theta - \theta) \quad (12)$$

In this expression, $\Delta P1'$ and $\Delta P2'$ are the pressure-difference changes measured at the end of the first equilibrium period and the end of the second equilibrium period in the inspection mode, respectively. To obtain the proportionality constant $\alpha$, it is necessary to change the temperature of the same device under the same ambient temperature to at least two temperatures $\Theta1$ and $\Theta2$ to measure pressure-difference changes $\Delta P4_1$ and $\Delta P4_2$ in the second inspection period. When a device that may have a leak is used and a leak pressure difference is expressed by CT2, the drift caused by the adiabatic change is attenuated to zero when a sufficiently long measurement period has elapsed. Therefore, the following expressions are satisfied.

$$CT2 + \alpha(\Theta1 - \theta1) = \Delta P4_1 \quad (13)$$

$$CT2 + \alpha(\Theta2 - \theta1) = \Delta P4_2 \quad (14)$$

From Expressions (13) and (14), the following expression is obtained.

$$\alpha = (\Delta P4_1 - \Delta P4_2)/(\Theta1 - \Theta2) \quad (15)$$

Therefore, Expression (12) can be expressed as follows:

$$J_T = K(\Delta P1' - \Delta P2') + \{(\Delta P4_1 - \Delta P4_2)/(\Theta1 - \Theta2)\}(\Theta - \theta) \quad (16)$$

When the drift correction coefficient K and the temperature-drift correction coefficient $\alpha$ are obtained in advance and stored in the calibration mode, and the temperature $\Theta$ of the device, the ambient temperature $\theta$, and $\Delta P1'$ and $\Delta P2'$ at the end of the first equilibrium period and the end of the second equilibrium period are measured, the drift $J_T$, which includes the drift generated by the difference between the temperature of the device and the ambient temperature, can be obtained. The pressure-difference change S corresponding to the actual leak can be estimated by subtracting the drift $J_T$ from the pressure-difference change measured in the first inspection period of duration T2 (FIG. 1) by $S = \Delta P3' - J_T$.

Leak Inspector

FIRST EMBODIMENT

Figure 2:
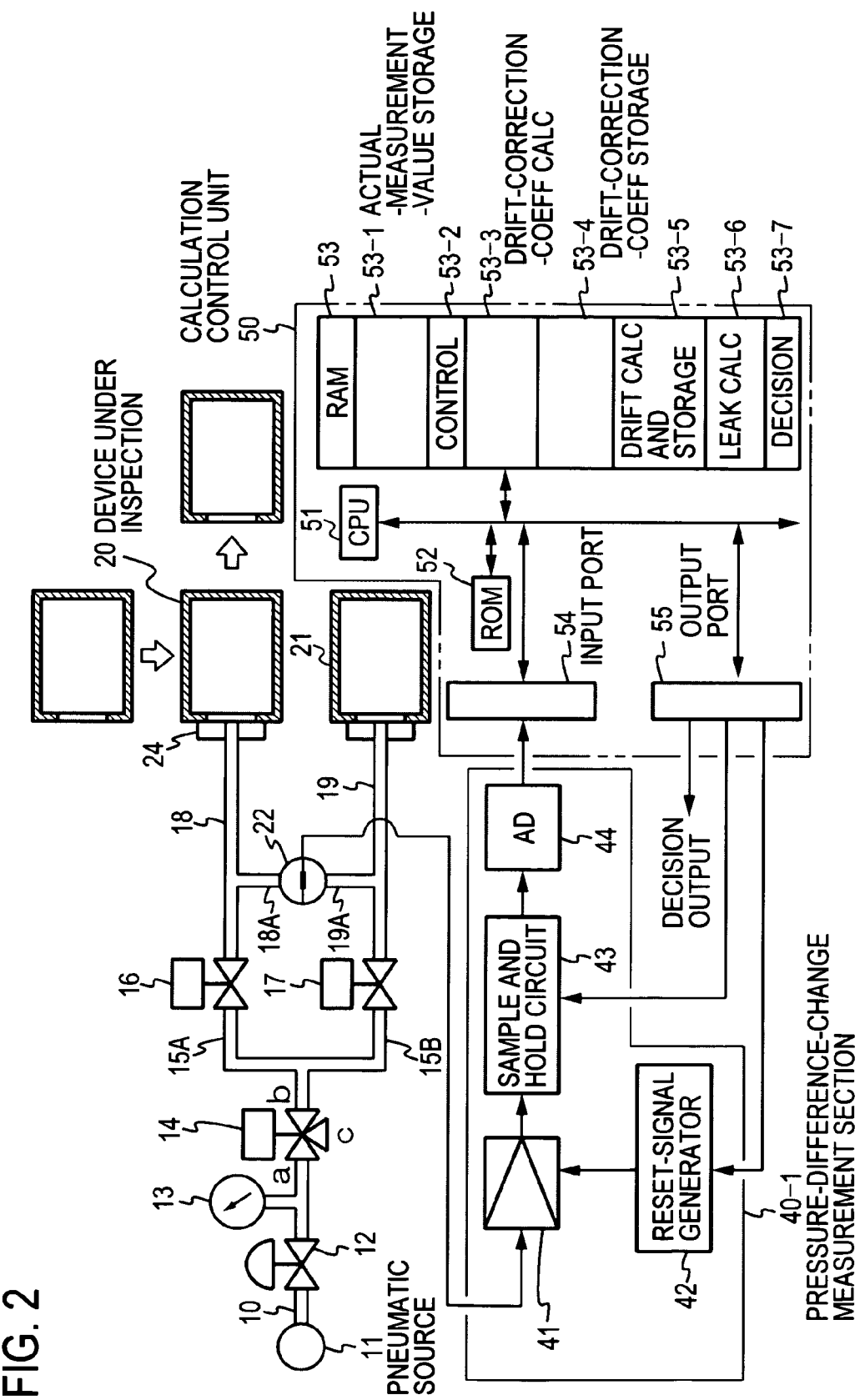
FIG. 2 is a block diagram of a leak inspector according to an embodiment of the present invention, which can execute the drift-correction-coefficient calculation method according to the present invention to calculate a drift correction coefficient, store it, and use it in an inspection mode.

FIG. 2 shows a leak inspector of an embodiment, operating with a drift correction coefficient calculated by the drift-correction-coefficient calculation method according to the present invention. In this embodiment, air pressure (gas pressure) is applied from a pneumatic source 11 to a device under inspection 20 and a reference tank 21, and it is determined whether the device 20 has a leak based on whether a pressure-difference detector 22 shows a pressure difference when a predetermined period of time elapses after the air pressure is applied.

The leak inspector shown in FIG. 2 operates with a cycle formed of a pressure applying period, an equilibrium period, an inspection period, and a discharge period. In the present embodiment, a pressure-difference-change measurement section 40-1 is provided to measure pressure-difference changes $\Delta P1$ and $\Delta P2$ at the end of a first half of duration T1 and the end of a second half of duration T1 (hereinafter the first-half equilibrium period is called a first equilibrium period and the second-half equilibrium period is called a second equilibrium period), respectively, the first half and the second half being formed by dividing the equilibrium period following the pressure applying period, as shown in FIG. 1; to measure a pressure-difference change $\Delta P3$ generated during the inspection period of duration T2 (this inspection period is called a first inspection period); and to measure a pressure-difference change CT2 (=$\Delta P4$) generated during a period of time T2 (this period is called a second inspection period) after the influence of the adiabatic change is sufficiently stable in the inspection period sufficiently extended, from the detection signal of the pressure-difference detector 22 in the calibration mode. A calculation control unit 50 includes a drift-correction-coefficient calculation section 53-3 for calculating a drift correction coefficient K using K=($\Delta P3$−CT2)/($\Delta P1$−$\Delta P2$) from the pressure-difference changes $\Delta P1$, $\Delta P2$, $\Delta P3$, and CT2 measured by the pressure-difference-change measurement section 40-1; a drift-correction-coefficient storage section 53-4 for storing the drift correction coefficient K calculated by the drift-correction-coefficient calculation section 53-3; a drift calculation and storage section 53-5 for calculating a drift J for each device under inspection in an inspection mode; a leak calculation section 53-6 for calculating a pressure-difference change S corresponding to the actual leak by subtracting the drift J from a pressure-difference change $\Delta P3'$ measured in the inspection mode; and a decision section 53-7.

The pressure-difference-change measurement section 40-1 includes an automatic-zero-reset amplifier 41 capable of being reset to a reset state by a reset signal; a reset-signal generator 42 for inputting the reset signal to the automatic-zero-reset amplifier 41; a sample and hold circuit 43 for sampling and holding a pressure-difference signal output from the automatic-zero-reset amplifier 41; and an AD converter 44 for AD converting the pressure-difference signal sampled and held by the sample and hold circuit 43.

Figure 3:
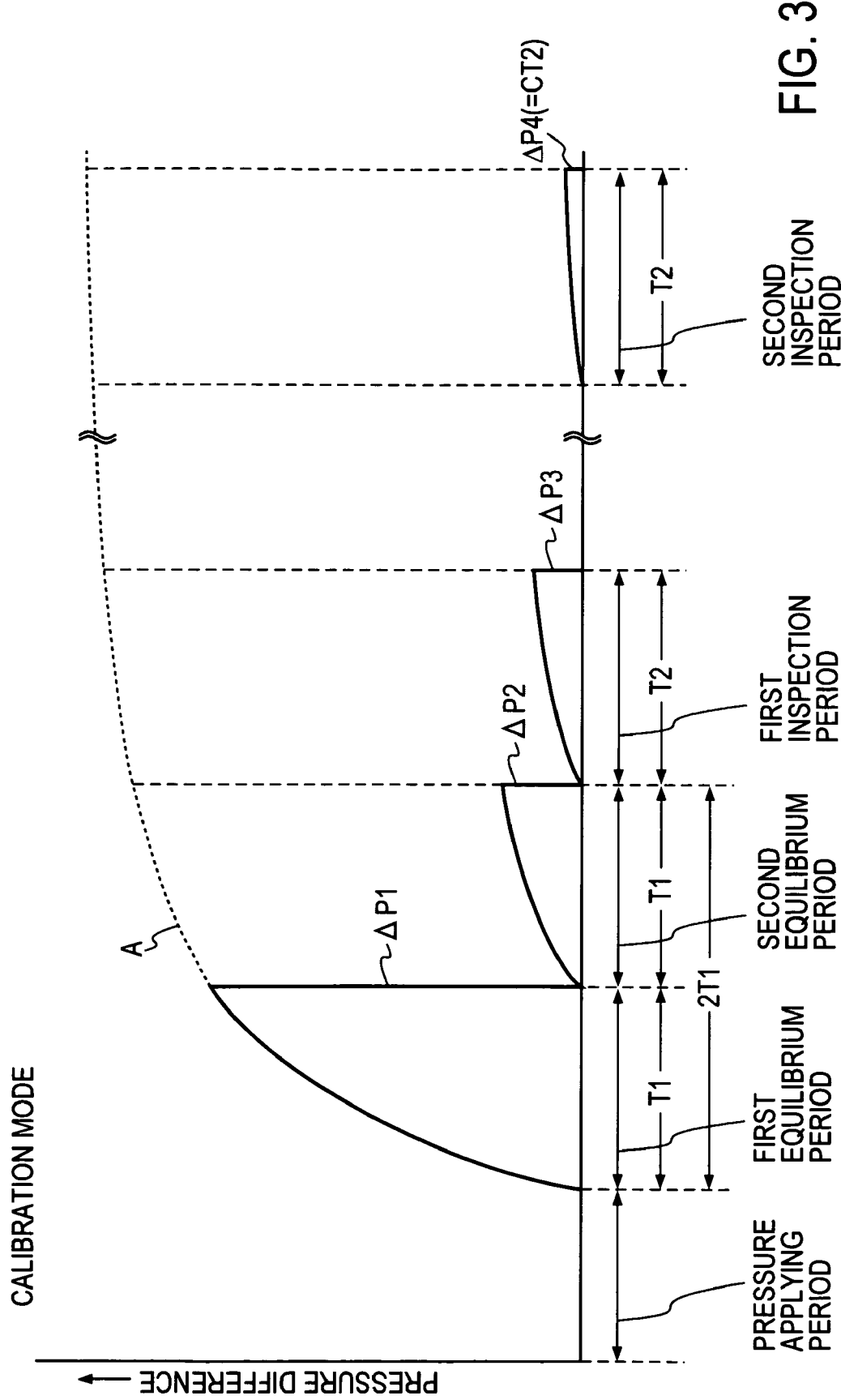
FIG. 3 is a graph showing an operation for calculating the drift correction coefficient in the leak inspector shown in FIG. 2.

To measure the pressure-difference changes $\Delta P1$ and $\Delta P2$ in the calibration mode, a device under inspection 20 for which it has been checked that the mounting section of the device 20 has no leak is mounted, and air pressure is applied to the device 20 and the reference tank 21 from the pneumatic source 11 for a predetermined period of time, namely, about three to five seconds. The period differs depending on the inspection pressure, and on the shape and material of the device. After the predetermined period of time elapses, valves 16 and 17 are closed. Then, an equilibrium period starts. In the present invention, a gain is applied to the automatic-zero-reset amplifier 41 when the equilibrium period starts, and the pressure-difference changes $\Delta P1$ and $\Delta P2$ are measured in a first equilibrium period and second equilibrium period. FIG. 3 shows the measurement state. In FIG. 3, a curve A shows the amplified output of the automatic-zero-reset amplifier 41. The curve A shown in FIG. 3 indicates a state in which measurement starts at the end of a pressure applying period with the gain applied to the automatic-zero-reset amplifier 41.

The reset-signal generator 42 sends the zero-reset signal to the automatic-zero-reset amplifier 41 to instantly reset the output of the automatic-zero-reset amplifier 41 to zero when the first equilibrium period elapses from the start of the measurement, when the second equilibrium period further elapses, and when the first inspection period further elapses. The pressure-difference changes ΔP1, ΔP2, ΔP3, and CT2 are measured immediately before the automatic-zero-reset amplifier 41 is reset every time duration T1 elapses, and then every time duration T2 elapses.

The pressure-difference changes ΔP1, ΔP2, ΔP3, and CT2 sampled and held by the sample and hold circuit 43 are AD converted by the AD converter 44 and input to the calculation control unit 50.

The calculation control unit 50 can be configured by a computer system. As is already well known, the computer system includes a central processing unit 51, a read-only memory 52 having a program stored therein, a rewritable memory 53 for storing input data, an input port 54, and an output port 55.

In the present embodiment, the rewritable memory 53 includes an actual-measurement-value storage section 53-1, and includes, in other memory areas, a program constituting a control section 53-2 for controlling the reset-signal generator 42, the sample and hold circuit 43, and valves 14, 16, and 17; a storage area for a program constituting the drift-correction-coefficient calculation section 53-3; a storage area constituting the drift-correction-coefficient storage section 53-4; an area having a program stored therein constituting the drift calculation and storage section 53-5; a storage area having a program stored therein constituting the leak calculation section 53-6; and a storage area having a program stored therein constituting the decision section 53-7.

In the present invention, the drift correction coefficient K is obtained from the pressure-difference changes ΔP1, ΔP2, ΔP3, and CT2 in the calibration mode, as described before. In this drift-correction-coefficient calculation method, the drift correction coefficient K is calculated by Expression (9), from the pressure-difference changes ΔP1, ΔP2, ΔP3, and CT2.

The drift-correction-coefficient calculation section 53-3 performs this calculation by Expression (9), and the drift-correction-coefficient storage section 53-4 stores the calculation result as the drift correction coefficient K. When this storage is finished, the calibration mode ends. As long as the drift correction coefficient K is stored, calibration needs to be performed when the size or shape of the device is changed or when the inspection conditions (such as the inspection pressure and inspection period) are changed.

Figure 4:
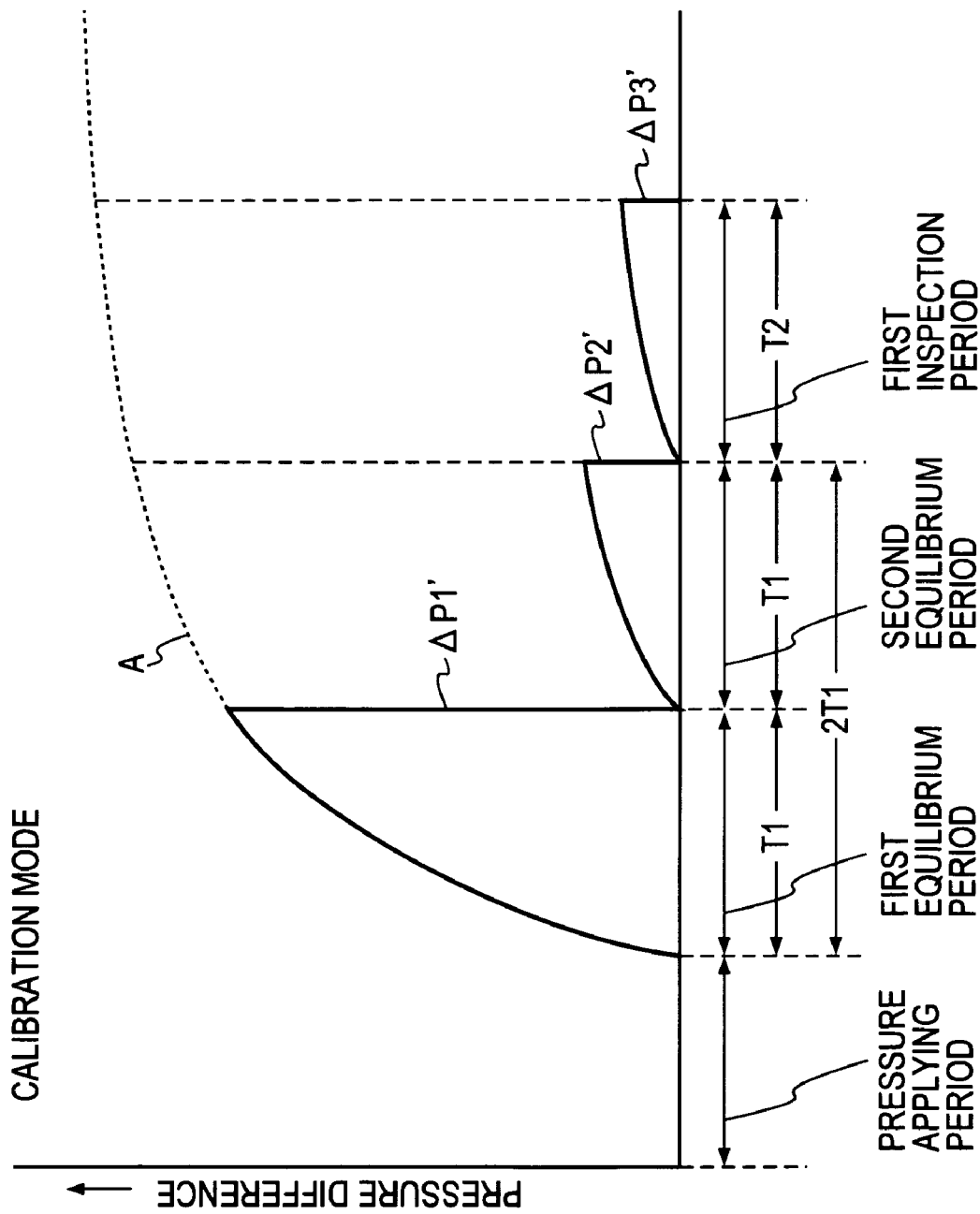
FIG. 4 is a graph showing an operation for calculating the drift correction coefficient and performing leak inspection by using the drift correction coefficient in the leak inspector shown in FIG. 2.

In the inspection mode, in the same way as in the calibration mode, gas pressure (air pressure) is applied to the device 20 and the reference tank 21; then, the valves 16 and 17 are closed; a gain is applied to the automatic-zero-reset amplifier 41 after a pressure applying period elapses; and pressure-difference changes ΔP1', ΔP2', and ΔP3' are measured in a first equilibrium period, a second equilibrium period, and an inspection period (see FIG. 4). When the pressure-difference changes ΔP1', ΔP2', and ΔP3' are obtained, the drift calculation and storage section 53-5 is activated to calculate the drift J included in the pressure-difference change ΔP3'.

In a method for calculating the drift J according to the present invention, the drift correction coefficient K stored in the drift-correction-coefficient storage section 53-4 is read, and the drift J is calculated by the drift calculation and storage section 53-5 from the drift correction coefficient K and the pressure-difference changes ΔP1' and ΔP2' measured in the inspection method, as follows:

$$J = (\Delta P1' - \Delta P2')K \quad (17)$$

By using this drift J, the pressure-difference change ΔP3' is corrected. The result can be regarded as the pressure-difference change obtainable in a state where the pressure-difference change converges to a certain value as if a long period of time passed. More specifically, a pressure-difference change S corresponding to the actual leak is calculated as follows by subtracting the drift J from the pressure-difference change ΔP3', measured in the inspection period.

$$S = \Delta P3' - J \quad (18)$$

The leak calculation section 53-6 performs this calculation.

When the pressure-difference change S (drift-corrected value) corresponding to the leak is calculated, the decision section 53-7 compares the pressure-difference change S corresponding to the leak with a reference value RV. When the pressure-difference change S corresponding to the leak is larger than the reference value RV, it is determined that a leak occurs. The decision result is externally output through an output port 55.

SECOND EMBODIMENT

Figure 5:
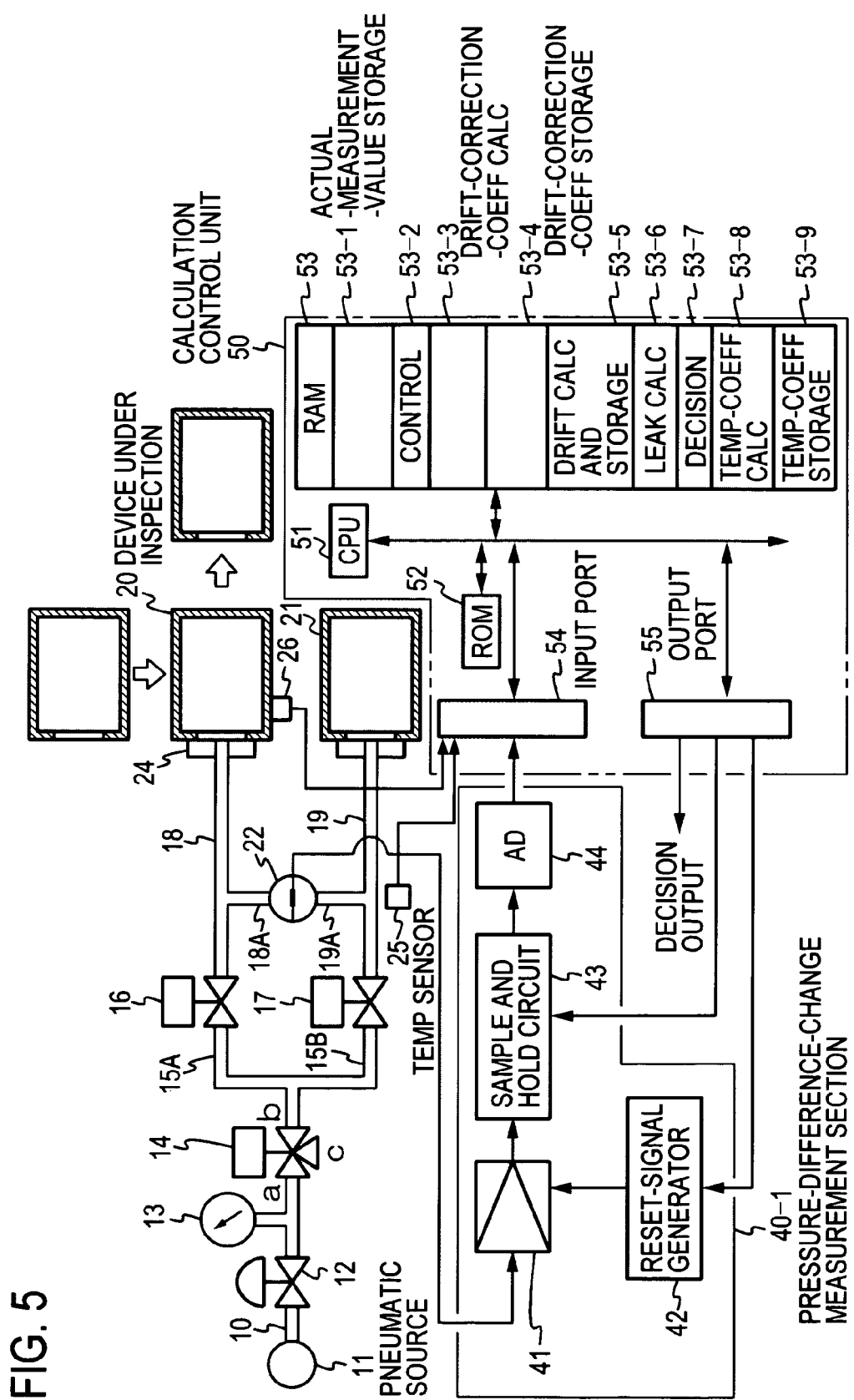
FIG. 5 is a block diagram of a leak inspector according to another embodiment of the present invention, which executes a drift-correction-coefficient calculation method, a drift calculation method, and a drift correction method of the present invention.

FIG. 5 shows a leak inspector for checking for a leak by using the drift calculation method, according to a second embodiment.

This embodiment differs from the embodiment shown in FIG. 2 in that temperature sensors 25 and 26 for measuring the ambient temperature θ and the temperature Θ of a device under inspection are further provided, and a calculation control unit 50 further includes a temperature-coefficient calculation section 53-8 and a temperature-coefficient storage section 53-9 for storing a temperature coefficient α calculated by the temperature-coefficient calculation section 53-8.

The temperature-coefficient calculation section 53-8 calculates the temperature-drift correction coefficient α using Expression (15) through measurements performed at different temperatures Θ1 and Θ2 of an identical device under inspection in a calibration mode. When the temperature-coefficient calculation section 53-8 calculates the temperature-drift correction coefficient α, the temperature-coefficient storage section 53-9 stores the temperature coefficient α.

In an inspection mode, a drift correction coefficient K is read from a drift-correction-coefficient storage section 53-4, and the temperature coefficient α is read from the temperature-coefficient storage section 53-9. The ambient temperature θ and the temperature Θ of a device under inspection 20 are also measured by the temperature sensors 25 and 26, and gas pressure is applied to the device 20 and a reference tank 21. Pressure-difference changes ΔP1' and ΔP2' are measured at intervals of duration T1 in an equilibrium period starting at the end of a pressure applying period. A pressure-difference change ΔP3' is also measured at duration T2 in an inspection period. The drift calculation and storage section 53-5 first calculates a drift $J_T$ using Expression (12) from these measured values ΔP1', ΔP2', and ΔP3' and the measured temperatures θ and Θ.

Then, the leak calculation section 53-6 uses the drift $J_T$ calculated by the drift calculation and storage section 53-5 to calculate a pressure-difference change S corresponding to the actual leak of the device 20 as follows:

$$S = \Delta P3' - J \quad (19)$$

Even when the temperature Θ of the device 20 differs from the ambient temperature θ, the pressure-difference change S corresponding to the leak, obtained here, is close to that corresponding to the actual leak, where the drift generated by the temperature difference between θ and Θ is removed.

When the leak calculation section 53-6 calculates the pressure-difference change S corresponding to the leak, the decision section 53-7 compares the pressure-difference change S with a reference value RV. When the pressure-difference change S is smaller than the reference value RV, it is determined that there is no leak. When the pressure-difference change S is larger than the reference value RV, it is determined that there is a leak.

THIRD EMBODIMENT

Figure 6:
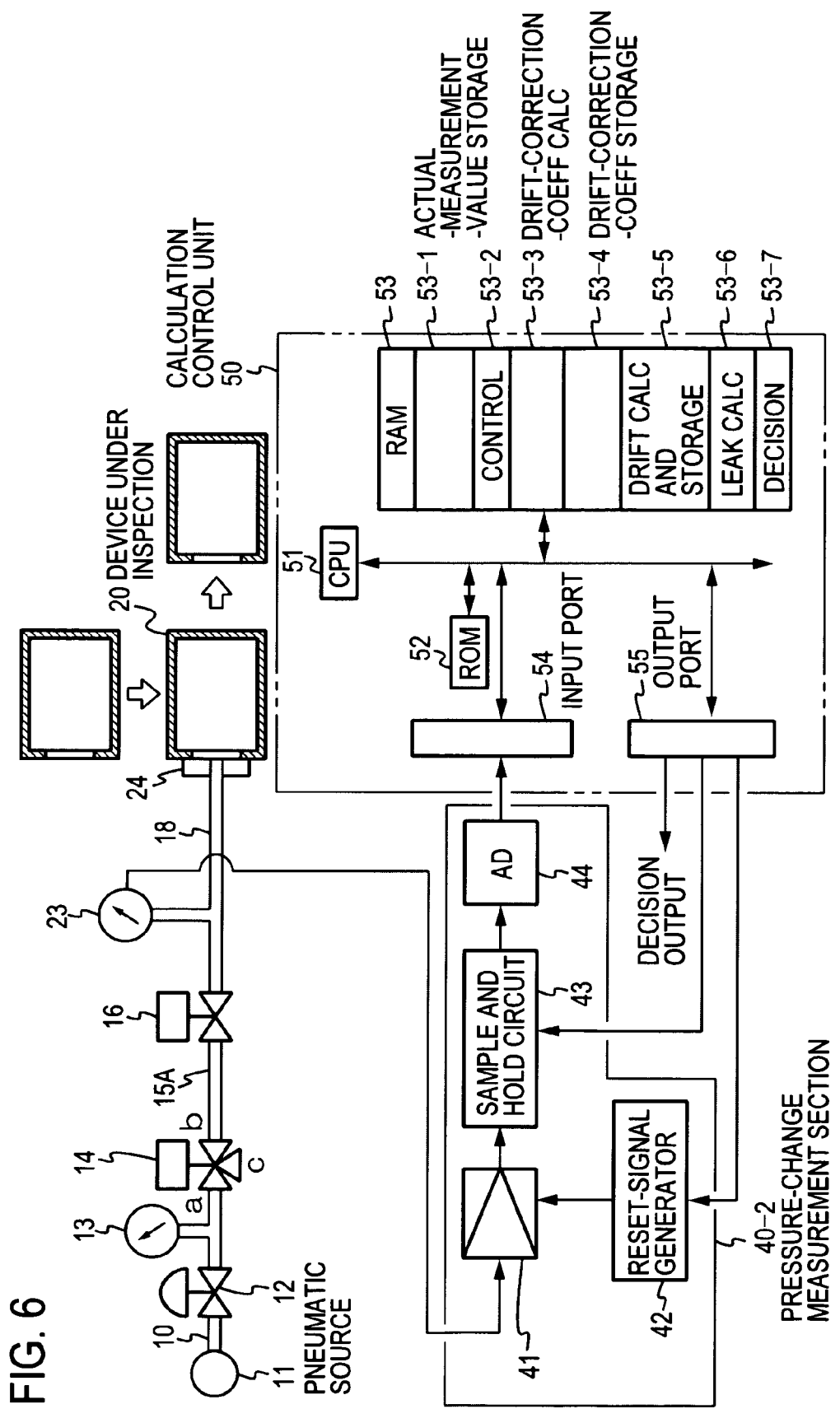
FIG. 6 is a block diagram of a gauge-pressure type leak inspector according to an embodiment of the present invention, which implements a drift-correction-coefficient calculation method of the present invention.

FIG. 6 shows a gauge-pressure type leak inspector according to a third embodiment of the present invention. This gauge-pressure type leak inspector differs from the pressure-difference leak inspector shown in FIG. 2 in that the gauge-pressure type leak inspector does not include the reference tank 21 and directly applies air pressure only to a device 20 under inspection to measure a change in pressure in the device 20. Therefore, in the third embodiment, the section formed of the automatic-zero-reset amplifier 41, the reset-signal generator 42, the sample and hold circuit 43, and the AD converter 44 is called a pressure-change measurement section 40-2.

Also for the gauge-pressure type leak inspector, in a calibration mode, an equilibrium period is divided into two parts, and pressure changes ΔQ1 and ΔQ2 are measured at the end of a first equilibrium period of duration T1 and the end of a second equilibrium period of duration T1. A pressure change ΔQ3 generated during a first inspection period of duration T2 is further measured. A pressure change ΔQ4 generated in the device 20 for duration T2 after a sufficient time has elapsed from the start of inspection, for example, after several tens of seconds elapse from a pressure applying period, is measured as ΔC. A drift correction coefficient K is calculated from these measured values using $K=(\Delta Q3-\Delta C)/(\Delta Q1-\Delta Q2)$.

The calculation of the drift correction coefficient K is performed by a drift-correction-coefficient calculation section 53-3 included in a calculation control unit 50 in the same way as in the embodiment shown in FIG. 2. The calculated drift correction coefficient K is stored in a drift-correction-coefficient storage section 53-4, and the calibration mode ends.

In an inspection mode, in the same way as in the calibration mode, pressure changes ΔQ1' and ΔQ2' are measured in the equilibrium period, and a pressure change ΔQ3' is measured in the inspection period. A drift calculation and storage section 53-5 calculates a drift J from these measured values and the drift correction coefficient K using Expression $J=(\Delta Q1'-\Delta Q2')K$. A leak calculation section 53-6 subtracts the drift J calculated by the drift calculation and storage section 53-5 from the pressure change ΔQ3' measured in the inspection period to obtain a pressure change U corresponding to the actual leak, for which drift correction has been made, using Expression $U=\Delta Q3'-J$. A decision section 53-7 compares the pressure change U corresponding to the leak with a reference value RV. When the pressure change U is larger than the reference value RV, it is determined that a leak occurs. When the pressure change U is smaller than the reference value RV, it is determined that there is no leak.

FOURTH EMBODIMENT

Figure 7:
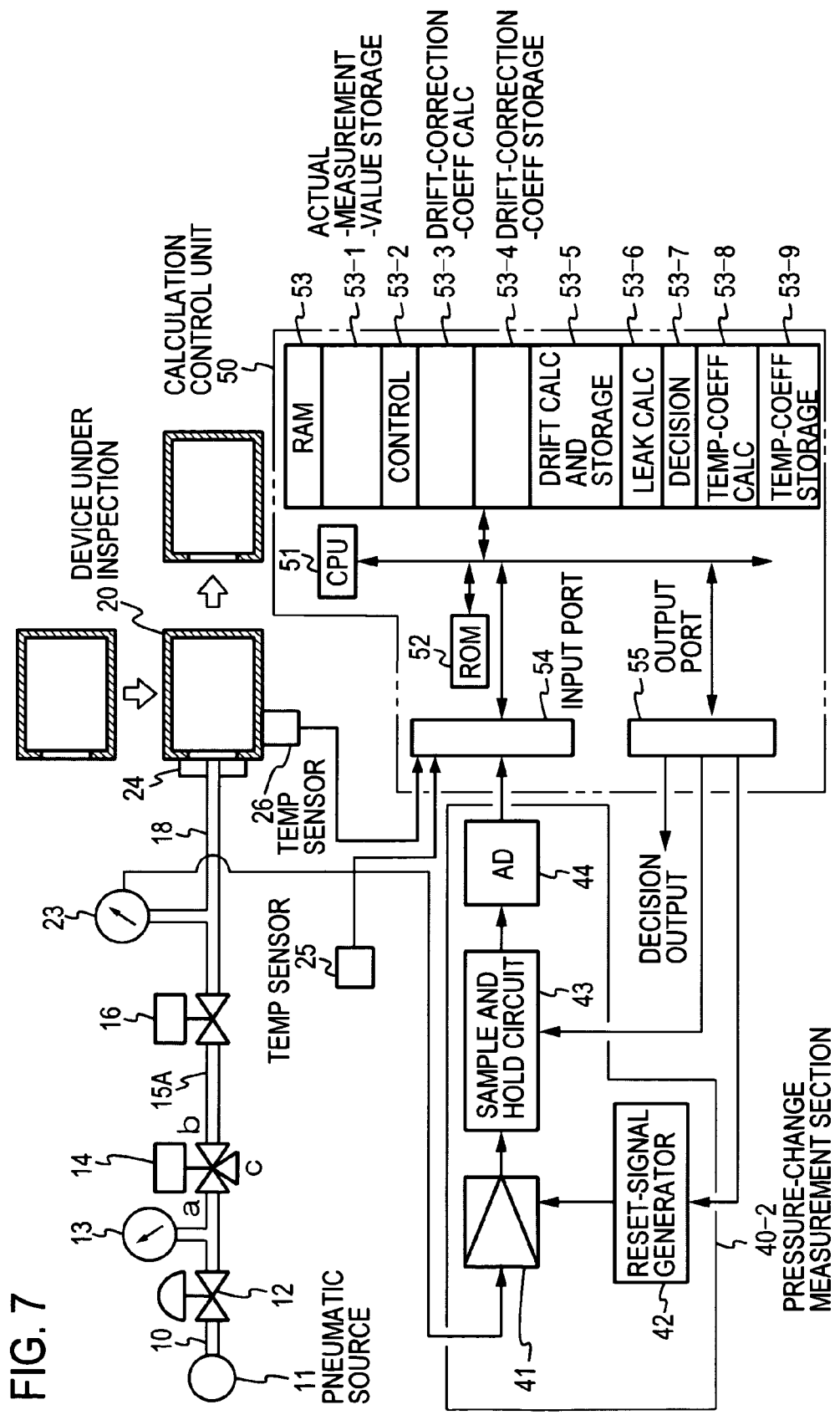
FIG. 7 is a block diagram of a gauge-pressure type leak inspector according to an embodiment of the present invention, which implements another drift-correction-coefficient calculation method of the present invention.
Figure 8:
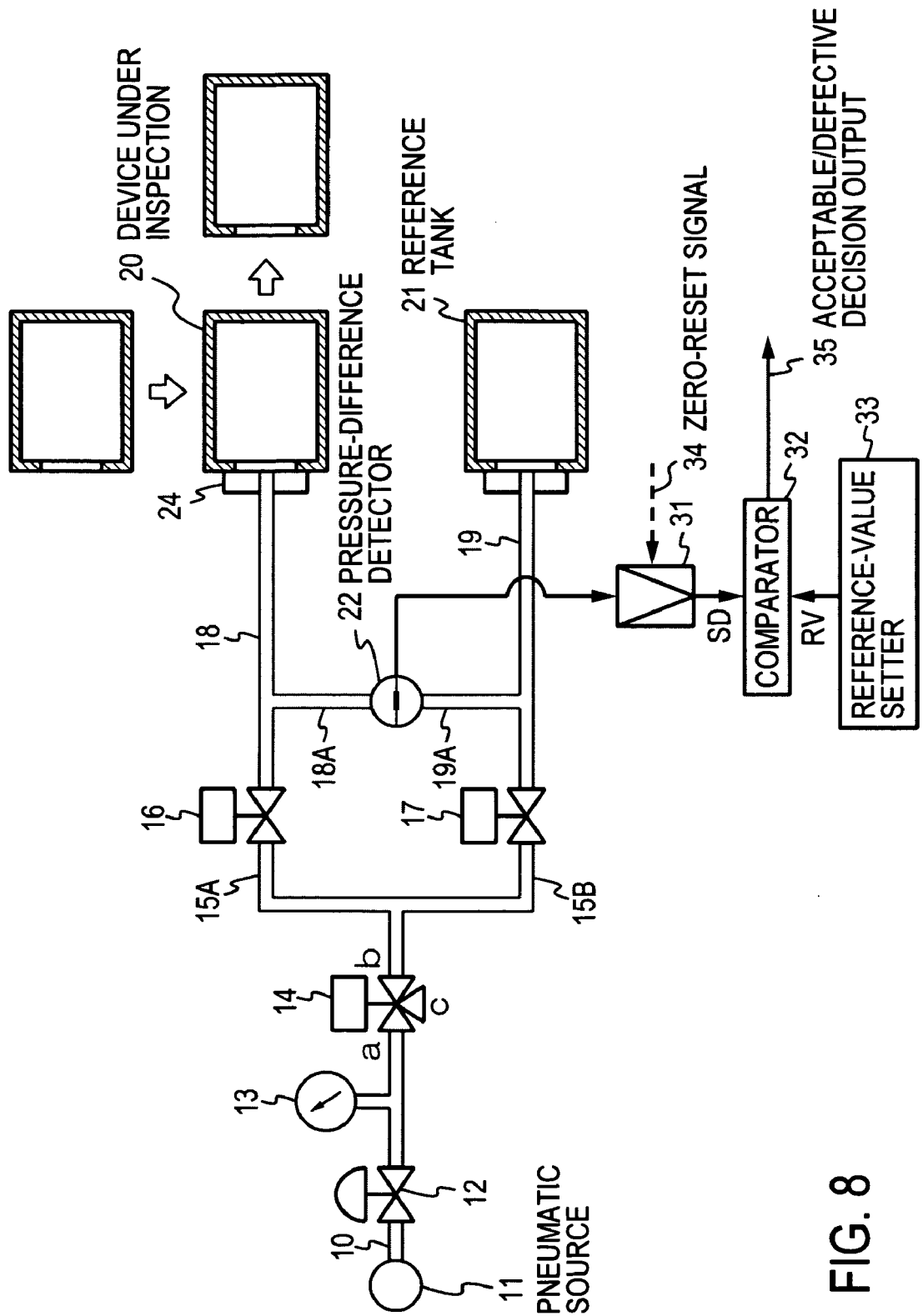
FIG. 8 is a block diagram showing the structure of a conventional leak inspector.
Figure 9:
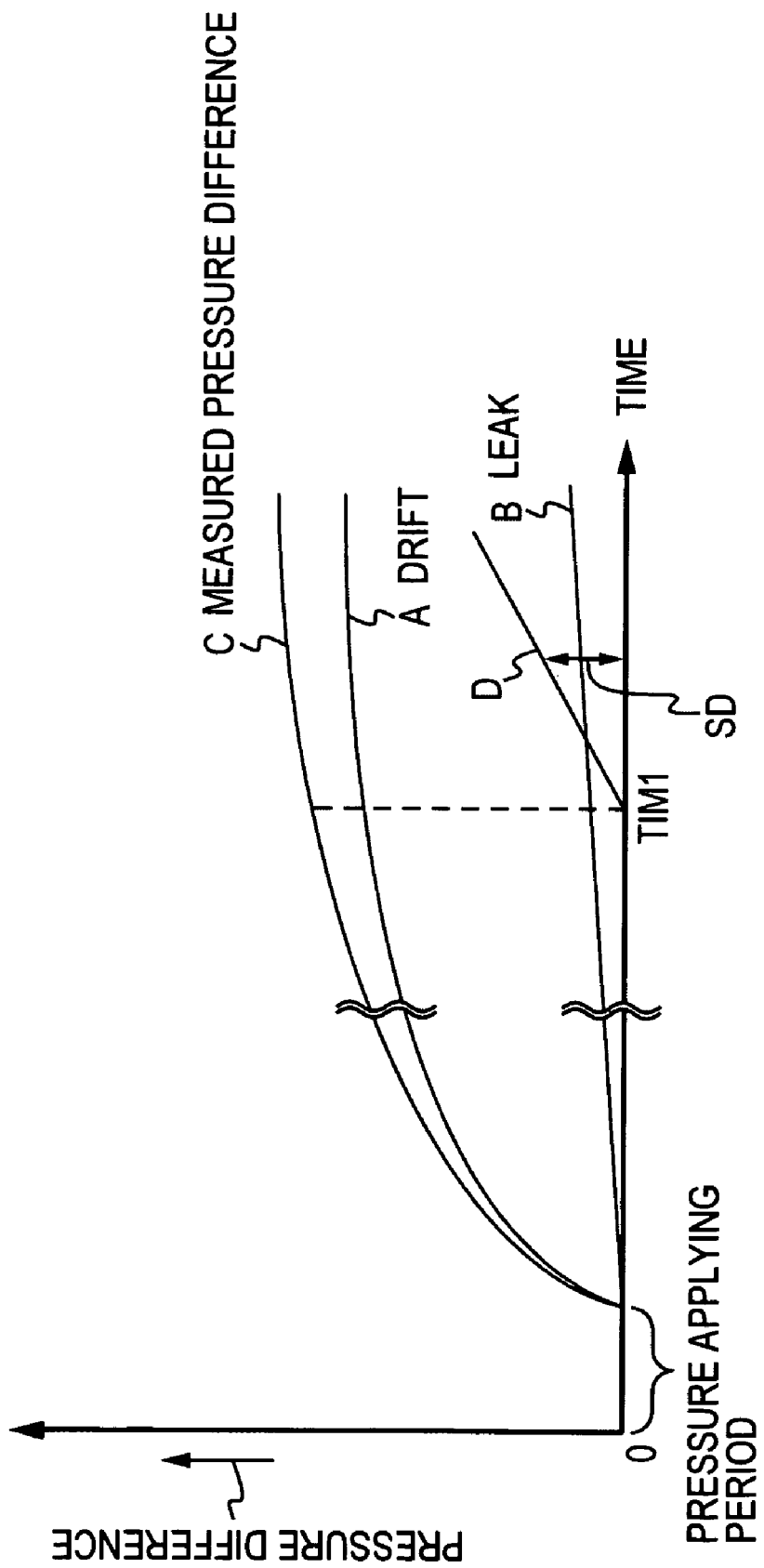
FIG. 9 is a graph showing a drift correction method used in the conventional leak inspector.
Figure 10:
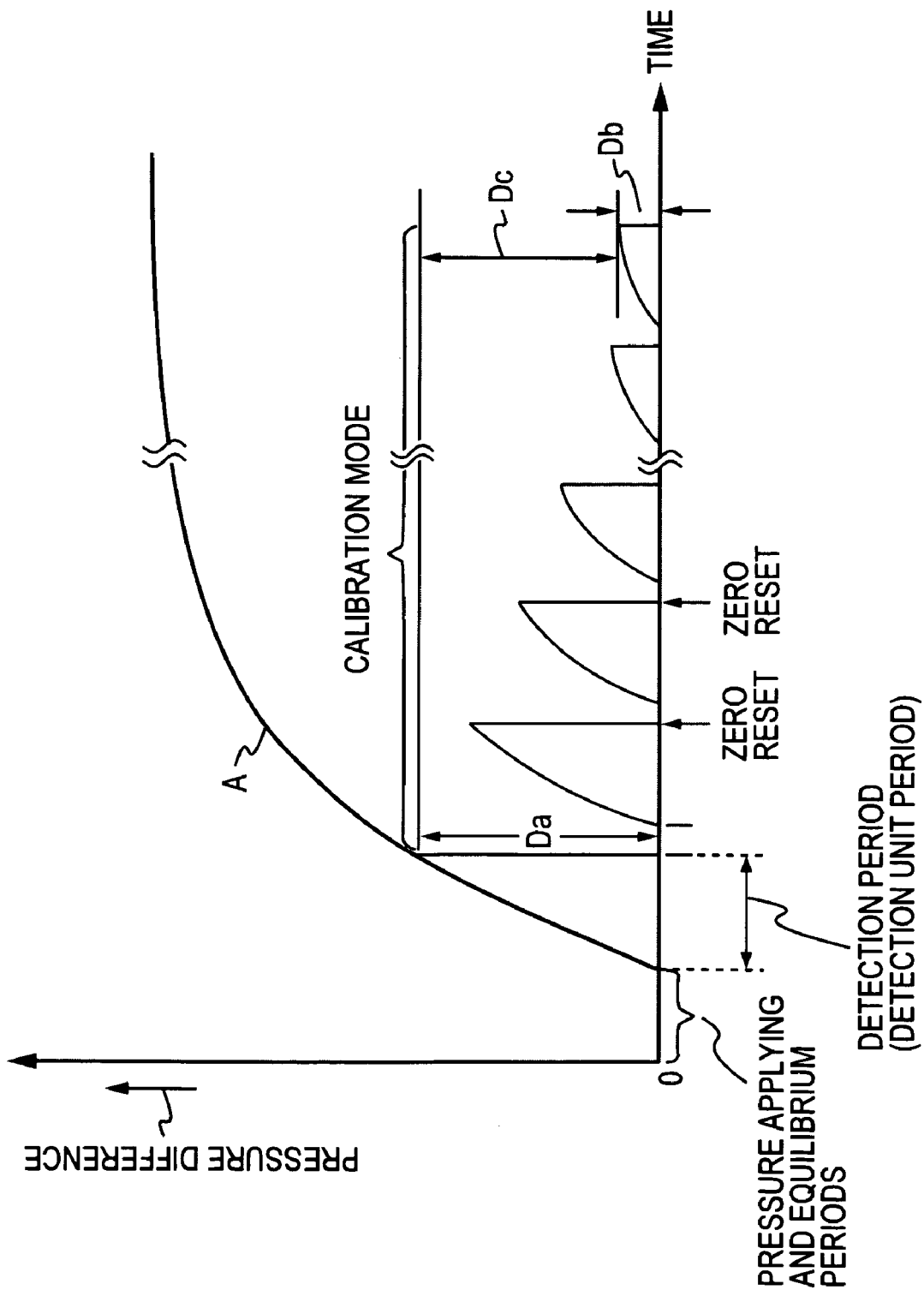
FIG. 10 is a graph showing another drift correction method used in the conventional leak inspector.
Figure 11:
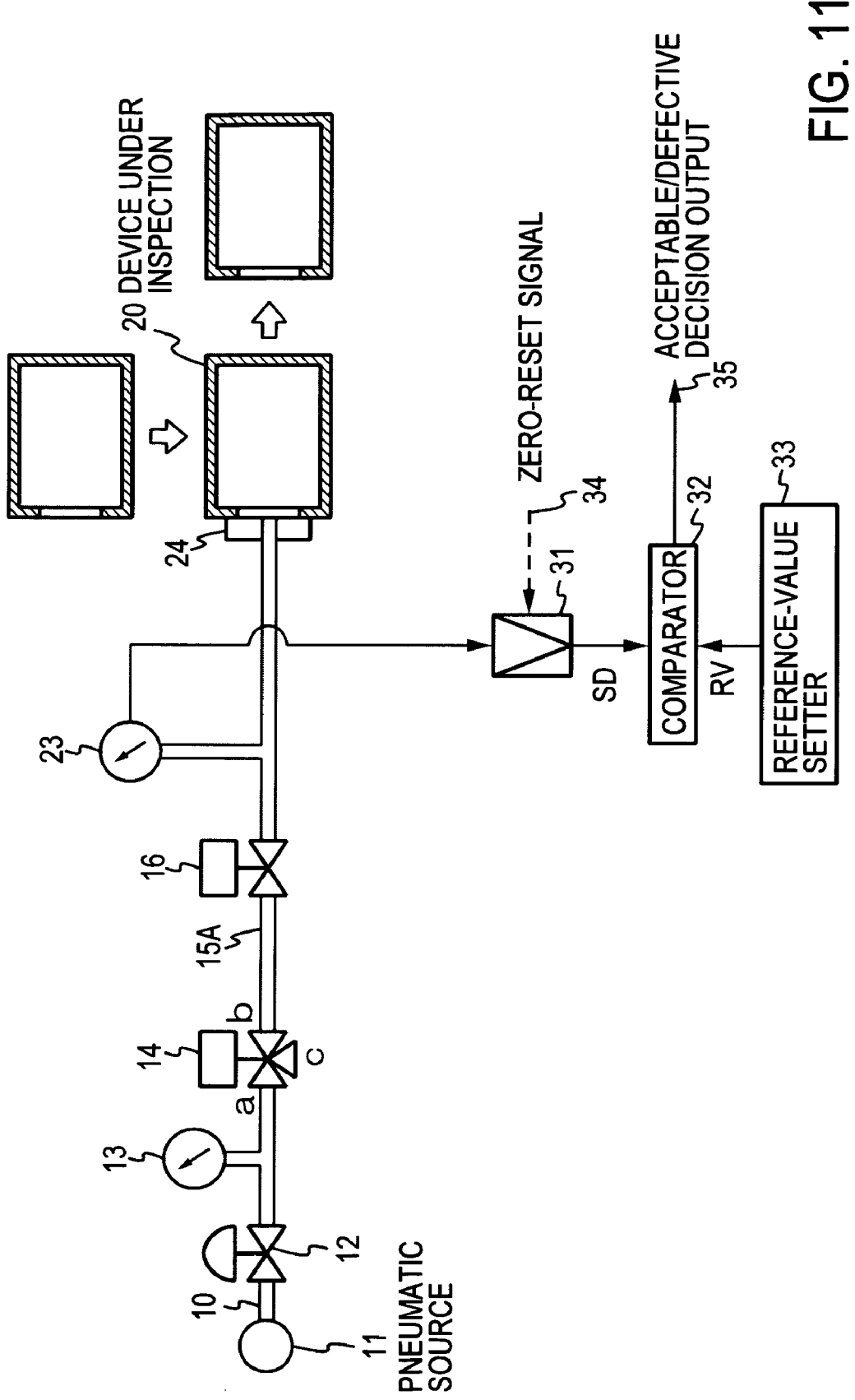
FIG. 11 is a block diagram showing the structure of a conventional gauge-pressure type leak inspector.

FIG. 7 shows another embodiment in which the gauge-pressure type leak inspector shown in FIG. 6 is further provided with a temperature sensor 25 for measuring the ambient temperature and a temperature sensor 26 for measuring the temperature of a device 20 under inspection in the same manner as shown in FIG. 5 to allow an appropriate drift correction to be performed even if the ambient temperature θ and the temperature Θ of the device, measured by the respective temperature sensors, differ.

Since this embodiment is the same as the embodiment shown in FIG. 5 except that the pneumatic circuit is of a gauge-pressure type, a more detailed description thereof is omitted here.

Modifications

In the embodiments shown in FIGS. 2, 5, 6, and 7, the pressure-difference-change measurement section 40-1 or the pressure-change measurement section 40-2 uses the automatic-zero-reset amplifier 41 to perform zero reset at each of the starting points of the first and second equilibrium periods and the first and second inspection periods, as shown in FIG. 3, for example, to directly detect the pressure-difference changes ΔP1, ΔP2, ΔP3, and CT2 (or pressure changes ΔQ1, ΔQ2, ΔQ3, and ΔC) at the ends of the periods. However, as is clearly understood, it is allowable to detect, without zero resetting, pressure differences P0, P1, P2, P3, P4, and P5 at the timing indicated by the pressure-difference characteristic curve shown in FIG. 1, for example, and the pressure-difference changes are calculated by the calculation control unit 50 using expressions $\Delta P1=P1-P0$, $\Delta P2=P2-P1$, $\Delta P3=P3-P2$, and $CT2=P5-P4$.

In these embodiments, as shown in FIG. 1 and FIG. 3, the first equilibrium period, the second equilibrium period, and the first inspection period are sequentially arranged without inserting a period of time therebetween. A predetermined period of time shorter than these periods may be inserted therebetween.

EXAMPLES

FIG. 13 shows examples of drift correction performed by the embodiment shown in FIG. 2. A tank checked for absence of a leak was used as a device under inspection. A drift correction coefficient K was calculated by the drift-correction-coefficient calculation method according to the present invention from data measured with the device set to 24° C. The room temperature (the temperatures of gases sealed in the device and a reference tank) was 24° C.

In FIG. 13, Column A indicates the temperature of the device under inspection (denoted by DUI), Column B indicates a pressure-difference change ΔP1' measured in a first equilibrium period (2.5 seconds), Column C indicates a pressure-difference change ΔP2' measured in a second equilibrium period (2.5 seconds), Column D indicates a pressure-difference change ΔP3' measured in an inspection period (3 seconds), Column E indicates the value of ΔP1'−ΔP2', Column F indicates the drift correction coefficient K calculated by the drift-correction-coefficient calculation method according to the present invention, which was 0.087, calculated from the average of measured values measured with the device set to 24° C., Column G indicates a drift $J=(\Delta P1'-\Delta P2')K$, and Column H indicates a correction result $S=\Delta P3'-J$, obtained by drift-correcting the measured value ΔP3' shown in Column D by the drift J shown in Column G. The unit of pressure-difference changes is daPa (deca-pascal).

For comparison, Column I indicates the value obtained by subtracting the average of the pressure-difference changes ΔP3' measured in the inspection period at a standard temperature 24° C., which is 4.1 (daPa), shown at the bottom of Column D, and used as a fixed drift J', from the pressure-difference changes ΔP3' measured in the inspection period, shown in Column D.

It is clear from Columns B, C, and D that the pressure-difference changes obtained in the first equilibrium period, the second equilibrium period, and the inspection period have the relationship ΔP1'>ΔP2'>ΔP3', and that the difference (shown in Column E) between the pressure-difference change ΔP' obtained in the first equilibrium period and the pressure-difference change ΔP2' obtained in the second equilibrium period is relatively large.

In the present invention, since the drift correction coefficient K is calculated from the expression K =(ΔP3'−CT2)/(ΔP1'−ΔP2') using the pressure-difference changes ΔP1' and ΔP2' in the equilibrium period, the denominator is large and it does not approach zero even when the equilibrium period is made long. In this point, the drift correction coefficient K is reliable.

In the example shown in FIG. 13, leak inspection was performed with the device checked for absence of a leak. Therefore, the drift-correction result should be almost zero, but the correction result was distributed in the range from +1.2 to −0.6 when the correction method that used the fixed drift (=4.1) was used, as shown in Column I.

In contrast, when the drift correction method that used the drift correction coefficient according to the present invention was used, the correction result was distributed in the range from +0.4 to −0.2, as shown in Column H, which converges to a value very close to zero. In this point, it is understood that the drift correction using the drift correction coefficient K according to the present invention is reliable.

What is claimed is:

1. A leak inspection method for applying gas to a device under inspection and a reference tank and for determining whether or not the device has a leak based on whether the device and the reference tank have a pressure difference equal to or larger than a predetermined value when a predetermined period of time elapses, the leak inspection method comprising:

in a calibration mode,
(a-1) a step of applying a predetermined gas pressure to the device and the reference tank only for a pressure applying period of a predetermined length and then stopping application thereof;
(a-2) a step of measuring a first pressure-difference change ΔP1 between pressure differences generated between the device and the reference tank in a first equilibrium period after the end of the pressure applying period;
(a-3) a step of measuring a second pressure-difference change ΔP2 between pressure differences generated between the device and the reference tank in a second equilibrium period after the end of the first equilibrium period;
(a-4) a step of measuring a third pressure-difference change ΔP3 between pressure differences generated between the device and the reference tank in a first inspection period after the end of the second equilibrium period;
(a-5) a step of measuring a fourth pressure-difference change ΔP4 between pressure differences generated between the device and the reference tank in a second inspection period after the end of the first inspection period; and
(a-6) a step of calculating and storing a drift correction coefficient K corresponding to a drift included in the third pressure-difference change ΔP3, from the difference (ΔP3−ΔP4) between the third and fourth pressure-difference changes and the difference (ΔP1−ΔP2) between the first and second pressure-difference changes, and of discharging the gas from the device and the reference tank; and in an inspection mode,
(b-1) a step of applying the predetermined gas pressure to the device and the reference tank only for the pressure applying period and then stopping application thereof;
(b-2) a step of measuring a first pressure-difference change ΔP1' between pressure differences generated between the device and the reference tank in the first equilibrium period;
(b-3) a step of measuring a second pressure-difference change ΔP2' between pressure differences generated between the device and the reference tank in the second equilibrium period;
(b-4) a step of measuring a third pressure-difference change ΔP3' between pressure differences generated between the device and the reference tank in the first inspection period;
(b-5) a step of estimating a drift included in the third pressure-difference change ΔP3', from the difference (ΔP1'−ΔP2') between the first and second pressure-difference changes and the drift correction coefficient K, and
(b-6) a step of estimating a leak of the device by subtracting the drift from the third pressure-difference change ΔP3', and of discharging the gas from the device and the reference tank.

2. The leak inspection method according to claim 1, wherein the first and second equilibrium periods have the same length, and the first and second inspection periods have the same length.

3. The leak inspection method according to claim 2, wherein
the drift correction coefficient K is calculated using K=(ΔP3−ΔP4)/(ΔP1−ΔP2) in the step (a-6);
the drift J is calculated using J=K(ΔP1'−ΔP2') in the step (b-5); and
a pressure-difference change corresponding to the leak is calculated using S=ΔP3'−J in the step (b-6).

4. The leak inspection method according to claim 2, wherein
the steps (a-1) to (a-5) are repeatedly executed at two different temperatures Θ1 and Θ2 of the device in the calibration mode to obtain fourth pressure-difference changes $\Delta P4_1$ and $\Delta P4_2$, respectively;
a temperature-drift correction coefficient α is further calculated using α=($\Delta P4_1$−$\Delta P4_2$)/(Θ1−Θ2) in the step (a-6);
the drift is calculated using $J_T$=K(ΔP1'−ΔP2')+α(Θ−θ) in the step (b-5), where Θ indicates the temperature of the device and θ indicates an ambient temperature in the inspection mode; and
a pressure-difference change corresponding to the leak is calculated using S=ΔP3'−$J_T$ in the step (b-6).

5. The leak inspection method according to one of claims 1 to 4, wherein the step (b-6) includes a step in which a pressure-difference change corresponding to the estimated leak is compared with a reference value and it is determined whether or not the device has a leak based on whether the pressure-difference change is larger or smaller than the reference value.

6. A leak inspector comprising:
a pneumatic source adapted to apply gas pressure to a device under inspection and a reference tank;

a pressure-difference measurement section adapted to measure a pressure-difference change between pressure differences generated between the device and the reference tank after gas having a predetermined pressure is applied to the device and the reference tank from the pneumatic source only for a pressure applying period of a predetermined length;

a drift-correction-coefficient calculation section adapted to calculate, from first and second pressure-difference changes ΔP1 and ΔP2 generated in a first equilibrium period after the pressure applying period and in a second equilibrium period following the first equilibrium period and measured by the pressure-difference measurement section, and from third and fourth pressure-difference changes ΔP3 and ΔP4 generated in a first inspection period after the second equilibrium period and in a second inspection period after the first inspection period and measured by the pressure-difference measurement section, a drift correction coefficient K corresponding to a drift included in the third pressure-difference change ΔP3, based on the difference (ΔP3−ΔP4) between the third and fourth pressure-difference changes and the difference (ΔP1−ΔP2) between the first and second pressure-difference changes, when gas pressure is applied to the device and the reference tank only for the pressure applying period in a calibration mode;

a drift-correction-coefficient storage section adapted to store the drift correction coefficient K;

a drift calculation section adapted to calculate, from first and second pressure-difference changes ΔP1' and ΔP2' generated in the first equilibrium period after the pressure applying period and in the second equilibrium period following the first equilibrium period and measured by the pressure-difference measurement section, and from a third pressure-difference change ΔP3' generated in the first inspection period after the second equilibrium period and measured by the pressure-difference measurement section, a drift included in the third pressure-difference change ΔP3', based on the difference (ΔP1'−ΔP2') between the first and second pressure-difference changes and the drift correction coefficient K, when gas pressure is applied to the device and the reference tank only for the pressure applying period in an inspection mode;

a drift correction section adapted to subtract the drift from the third pressure-difference change ΔP3' to calculate a pressure-difference change S in which drift correction has been made; and a decision section adapted to compare the pressure-difference change S with a setting, and to determine that the device has a leak when the pressure-difference change S exceeds the setting.

7. The leak inspector according to claim 6, wherein the first and second equilibrium periods have the same length, and the first and second inspection periods have the same length.

8. The leak inspector according to claim 7, wherein
the drift-correction-coefficient calculation section is adapted to calculate the drift correction coefficient K using $K=(\Delta P3-\Delta P4)/(\Delta P1-\Delta P2)$;
the drift calculation section is adapted to calculate the drift J using $J=K(\Delta P1'-\Delta P2')$; and
the drift correction section is adapted to calculate a pressure-difference change S corresponding to the leak using $S=\Delta P3'-J$.

9. The leak inspector according to claim 7, further comprising:

a temperature-coefficient calculation section adapted to calculate, from fourth pressure-difference changes $\Delta P4_1$ and $\Delta P4_2$ obtained at two different temperatures Θ1 and Θ2 of the device in the calibration mode by the pressure-difference measurement section, a temperature-drift correction coefficient α using $\alpha=(\Delta P4_1-\Delta P4_2)/(\Theta1-\Theta2)$; and a temperature-coefficient storage section adapted to store the temperature-drift correction coefficient α;

wherein the drift calculation section is adapted to calculate the drift using $J_T=K(\Delta P1'-\Delta P2')+\alpha(\Theta-\theta)$, where Θ indicates the temperature of the device and θ indicates an ambient temperature in the inspection mode; and the drift correction section is adapted to calculate the pressure-difference change S in which the drift correction has been made, using $S=\Delta P3'-J_T$.

10. A leak inspection method for applying gas to a device under inspection and for determining whether or not the device has a leak based on whether a pressure change equal to or larger than a predetermined value occurs when a predetermined period of time elapses, the leak inspection method comprising:

in a calibration mode,
(a-1) a step of applying a predetermined gas pressure to the device only for a pressure applying period of a predetermined length and then stopping application thereof;
(a-2) a step of measuring a first pressure change ΔQ1 of the device generated in a first equilibrium period after the end of the pressure applying period;
(a-3) a step of measuring a second pressure change ΔQ2 of the device generated in a second equilibrium period after the end of the first equilibrium period;
(a-4) a step of measuring a third pressure change ΔQ3 of the device generated in a first inspection period after the end of the second equilibrium period;
(a-5) a step of measuring a fourth pressure change ΔQ4 of the device generated in a second inspection period after the end of the first inspection period; and
(a-6) a step of calculating and storing a drift correction coefficient K corresponding to a drift included in the third pressure change ΔQ3, from the difference (ΔQ3−ΔQ4) between the third and fourth pressure changes and the difference (ΔQ1−ΔQ2) between the first and second pressure changes, and of discharging the gas from the device; and in an inspection mode,
(b-1) a step of applying the predetermined gas pressure to the device only for the pressure applying period and then stopping application thereof;
(b-2) a step of measuring a first pressure change ΔQ1' of the device generated in the first equilibrium period;
(b-3) a step of measuring a second pressure change ΔQ2' of the device generated in the second equilibrium period;
(b-4) a step of measuring a third pressure change ΔQ3' of the device generated in the first inspection period;
(b-5) a step of estimating a drift included in the third pressure change ΔQ3', from the difference (ΔQ1'−ΔQ2') between the first and second pressure changes and the drift correction coefficient K, and
(b-6) a step of estimating a leak of the device by subtracting the drift from the third pressure change ΔQ3', and of discharging the gas from the device.

11. The leak inspection method according to claim 10, wherein the first and second equilibrium periods have the same length, and the first and second inspection periods have the same length.

12. The leak inspection method according to claim 11, wherein
   the drift correction coefficient K is calculated using $K=(\Delta Q3-\Delta Q4)/(\Delta Q1-\Delta Q2)$ in the step (a-6);
   the drift J is calculated using $J=K(\Delta Q1'-\Delta Q2')$ in the step (b-5); and
   a pressure change U corresponding to the leak is calculated using $U=\Delta Q3'-J$ in the step (b-6).

13. The leak inspection method according to claim 11, wherein
   the steps (a-1) to (a-5) are repeatedly executed at two different temperatures $\Theta 1$ and $\Theta 2$ of the device in the calibration mode to obtain fourth pressure changes $\Delta Q4_1$ and $\Delta Q4_2$, respectively;
   a temperature-drift correction coefficient $\alpha$ is further calculated using $\alpha=(\Delta Q4_1-\Delta Q4_2)/(\Theta 1-\Theta 2)$ in the step (a-6);
   the drift $J_T$ is calculated using $J_T=K(\Delta Q1'-\Delta Q2')+\alpha(\Theta-\theta)$ in the step (b-5), where $\Theta$ indicates the temperature of the device and $\theta$ indicates an ambient temperature in the inspection mode; and
   a pressure change U corresponding to the leak is calculated using $U=\Delta Q3'-J_T$ in the step (b-6).

14. The leak inspection method according to one of claims 10 to 13, wherein the step (b-6) includes a step in which a pressure change corresponding to the estimated leak is compared with a reference value and it is determined whether or not the device has a leak based on whether the pressure change is larger or smaller than the reference value.

15. A leak inspector comprising:
   a pneumatic source adapted to apply gas pressure to a device under inspection;
   a pressure measurement section adapted to measure a pressure change generated in the device after gas having a predetermined pressure is applied to the device from the pneumatic source only for a pressure applying period of a predetermined length;
   a drift-correction-coefficient calculation section adapted to calculate, from first and second pressure changes $\Delta Q1$ and $\Delta Q2$ generated in a first equilibrium period after the pressure applying period and in a second equilibrium period following the first equilibrium period and measured by the pressure measurement section, and from third and fourth pressure changes $\Delta Q3$ and $\Delta Q4$ generated in a first inspection period after the second equilibrium period and in a second inspection period after the first inspection period and measured by the pressure measurement section, a drift correction coefficient K corresponding to a drift included in the third pressure change $\Delta Q3$, based on the difference $(\Delta Q3-\Delta Q4)$ between the third and fourth pressure changes and the difference $(\Delta Q1-\Delta Q2)$ between the first and second pressure changes, when gas pressure is applied to the device only for the pressure applying period in a calibration mode;
   a drift-correction-coefficient storage section adapted to store the drift correction coefficient K;
   a drift calculation section adapted to calculate, from first and second pressure changes $\Delta Q1'$ and $\Delta Q2'$ generated in the first equilibrium period after the pressure applying period and in the second equilibrium period following the first equilibrium period and measured by the pressure measurement section, and from a third pressure change $\Delta Q3'$ generated in the first inspection period after the second equilibrium period and measured by the pressure measurement section, a drift included in the third pressure change $\Delta Q3'$, based on the difference $(\Delta Q1'-\Delta Q2')$ between the first and second pressure changes and the drift correction coefficient K, when gas pressure is applied to the device only for the pressure applying period in an inspection mode;
   a drift correction section adapted to subtract the drift from the third pressure change $\Delta Q3'$ to calculate a pressure change U in which drift correction has been made; and
   a decision section adapted to compare the pressure change U with a setting, and to determine that the device has a leak when the pressure change U exceeds the setting.

16. The leak inspector according to claim 15, wherein the first and second equilibrium periods have the same length, and the first and second inspection periods have the same length.

17. The leak inspector according to claim 16, wherein
   the drift-correction-coefficient calculation section is adapted to calculate the drift correction coefficient K using $K=(\Delta Q3-\Delta Q4)/(\Delta Q1-\Delta Q2)$;
   the drift calculation section is adapted to calculate the drift J using $J=K(\Delta Q1'-\Delta Q2')$; and
   the drift correction section is adapted to calculate a pressure change U corresponding to the leak using $U=\Delta Q3'-J$.

18. The leak inspector according to claim 16, further comprising:
   a temperature-coefficient calculation section adapted to calculate, from fourth pressure changes $\Delta Q4_1$ and $\Delta Q4_2$ obtained at two different temperatures $\Theta 1$ and $\Theta 2$ of the device in the calibration mode by the pressure measurement section, a temperature-drift correction coefficient $\alpha$ using $\alpha=(\Delta Q4_1-\Delta Q4_2)/(\Theta 1-\Theta 2)$; and
   a temperature-coefficient storage section adapted to store the temperature-drift correction coefficient $\alpha$;
   wherein the drift calculation section is adapted to calculate the drift using $J_T=K(\Delta Q1'-\Delta Q2')+\alpha(\Theta-\theta)$, where $\Theta$ indicates the temperature of the device and $\theta$ indicates an ambient temperature in the inspection mode; and
   the drift correction section is adapted to calculate the pressure change U in which the drift correction has been made, using $U=\Delta Q3'-J_T$.

* * * * *